United States Patent
Ishihara

[11] Patent Number: 6,122,454
[45] Date of Patent: Sep. 19, 2000

[54] VIEWFINDER OPTICAL SYSTEM

[75] Inventor: Jun Ishihara, Kobe, Japan

[73] Assignee: Minolta Co., Ltd., Osaka, Japan

[21] Appl. No.: 09/228,685

[22] Filed: Jan. 12, 1999

[30] Foreign Application Priority Data

| Jan. 13, 1998 | [JP] | Japan | 10-004681 |
| Jan. 16, 1998 | [JP] | Japan | 10-006377 |
| Jan. 16, 1998 | [JP] | Japan | 10-006380 |
| Jan. 16, 1998 | [JP] | Japan | 10-006387 |
| Jan. 16, 1998 | [JP] | Japan | 10-006398 |

[51] Int. Cl.$^7$ .................................................. G03B 13/08
[52] U.S. Cl. .......................... 396/384; 396/386; 359/631
[58] Field of Search ................... 359/631; 396/373, 396/376, 382, 385, 386, 384

[56] References Cited

U.S. PATENT DOCUMENTS

| 3,810,221 | 5/1974 | Plummer | 396/382 |
| 3,836,931 | 9/1974 | Plummer | 396/386 |
| 3,860,940 | 1/1975 | Baker | 396/386 |
| 3,958,261 | 5/1976 | Land et al. | 396/386 |
| 5,095,326 | 3/1992 | Nozaki et al. | 396/384 |
| 5,663,833 | 9/1997 | Nanba et al. | 359/631 |
| 5,701,202 | 12/1997 | Takahashi | 396/384 |
| 5,749,008 | 5/1998 | Ishihara et al. | |
| 5,886,824 | 3/1999 | Takahashi | 396/631 |
| 5,982,561 | 11/1999 | Ishihara et al. | |

FOREIGN PATENT DOCUMENTS

| 7-191274 | 7/1995 | Japan . |
| 7-218860 | 8/1995 | Japan . |
| 7-234376 | 9/1995 | Japan . |
| 8-292371 | 11/1996 | Japan . |
| 9-083908 | 3/1997 | Japan . |
| 9-222564 | 8/1997 | Japan . |

Primary Examiner—Russell Adams
Attorney, Agent, or Firm—Sidley & Austin

[57] ABSTRACT

A viewfinder optical system directs a luminous flux emanating from an image plane to a pupil. The viewfinder optical system has an eyepiece optical system. The eyepiece optical system enlarges an image in order to be viewed by the pupil. The eyepiece optical system has a first lens unit, a second lens unit and a third lens unit. The first lens unit has at least one surface having a positive optical power. The second lens unit has at least one surface having a negative optical power. The third lens unit has a reflecting surface having a positive optical power.

43 Claims, 30 Drawing Sheets

FIG.8
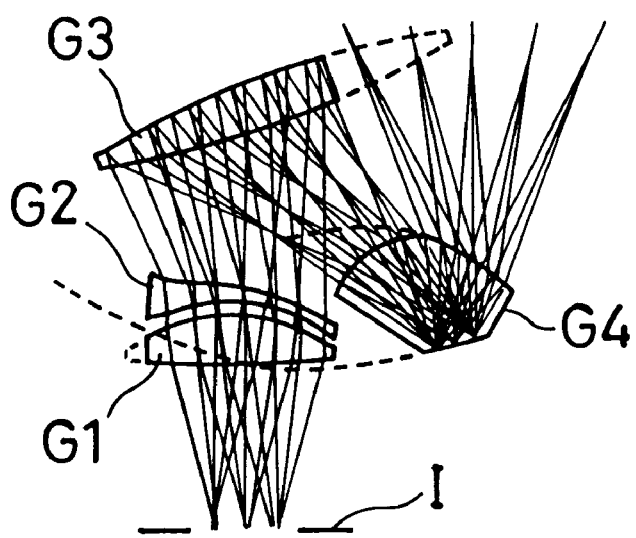
FIG.9
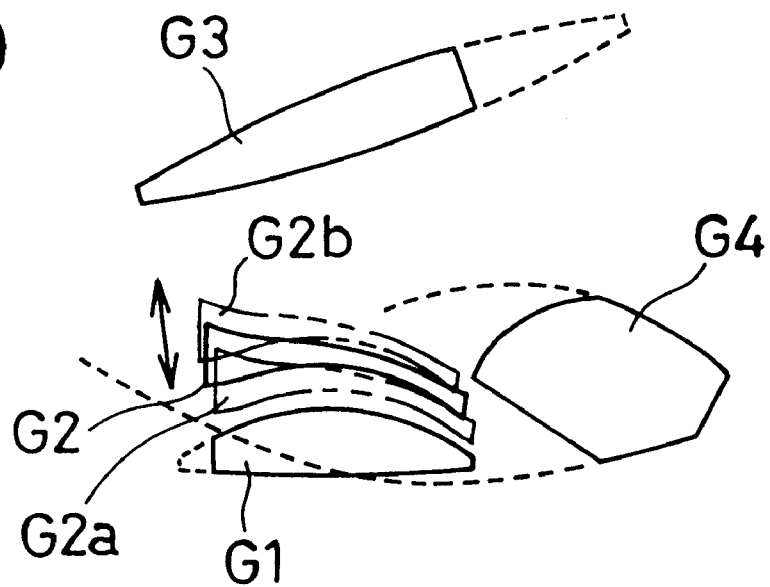

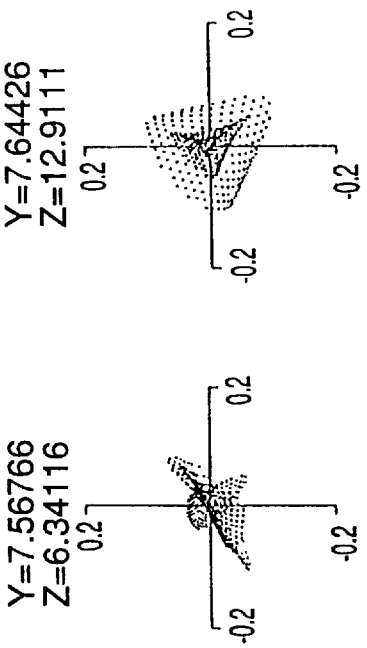
FIG. 11a Y=7.29539 Z=-13.0923
FIG. 11b Y=7.39001 Z=-6.56469
FIG. 11c Y=7.39485 Z=-0.111182
FIG. 11d Y=7.56766 Z=6.34116
FIG. 11e Y=7.64426 Z=12.9111
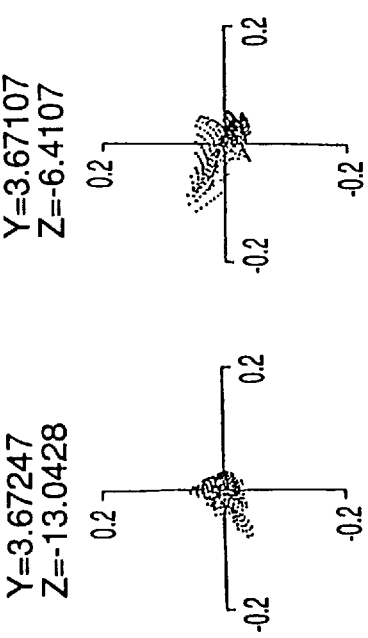
FIG. 11f Y=3.67247 Z=-13.0428
FIG. 11g Y=3.67107 Z=-6.4107
FIG. 11h Y=3.67023 Z=-0.0269246
FIG. 11i Y=3.78294 Z=6.39192
FIG. 11j Y=3.84809 Z=13.0614

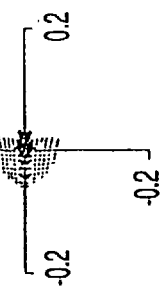
FIG. 11o
Y=9.10805e-19
Z=13.1097
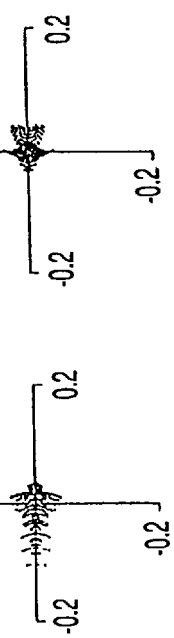
FIG. 11n
Y=-2.49273e-18
Z=6.40495
FIG. 11m
Y=1.91748e-19
Z=0.00115643
FIG. 11l
Y=-2.87623e-19
Z=-6.35628
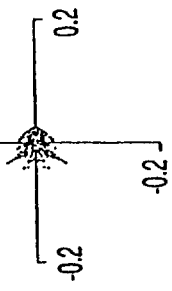
FIG. 11k
Y=1.05462e-18
Z=-13.0157

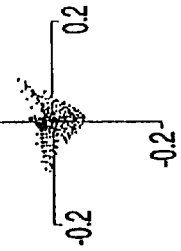
FIG. 12e Y=7.4364,Z=6.52279
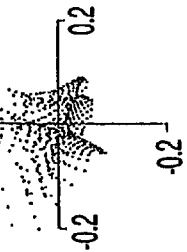
FIG. 12d Y=7.4327,Z=-13.0611
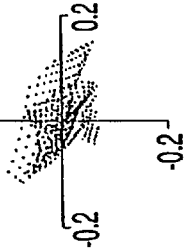
FIG. 12c Y=11.0461,Z=6.22917
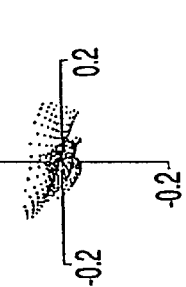
FIG. 12b Y=11.0221,Z=-0.169112
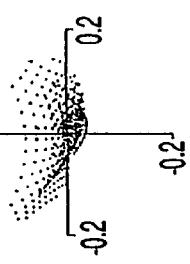
FIG. 12a Y=11.0325,Z=-6.57492
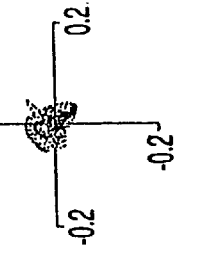
FIG. 12j Y=3.7132,Z=6.50166
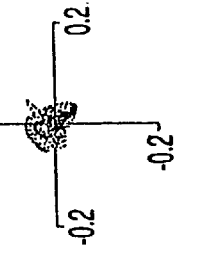
FIG. 12i Y=3.72345,Z=-13.0162
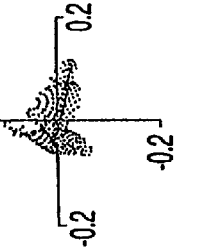
FIG. 12h Y=7.46945,Z=12.8689
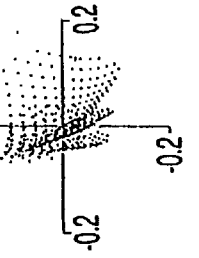
FIG. 12g Y=7.36599,Z=6.30278
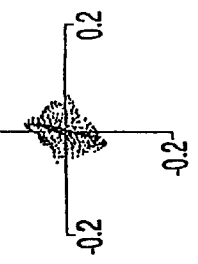
FIG. 12f Y=7.39165,Z=-0.0757526

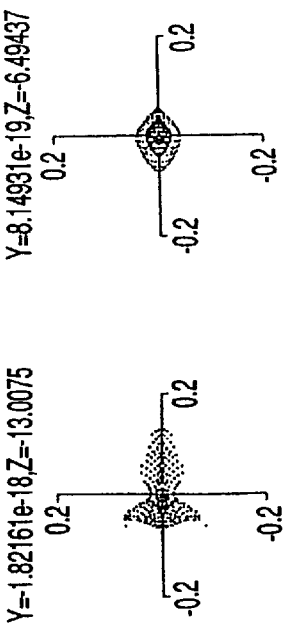
FIG. 12k Y=3.67908,Z=-0.00908343
FIG. 12l Y=3.6554,Z=6.35829
FIG. 12m Y=3.70582,Z=12.9193
FIG. 12n Y=1.82161e-18,Z=13.0075
FIG. 12o Y=8.14931e-19,Z=6.49437
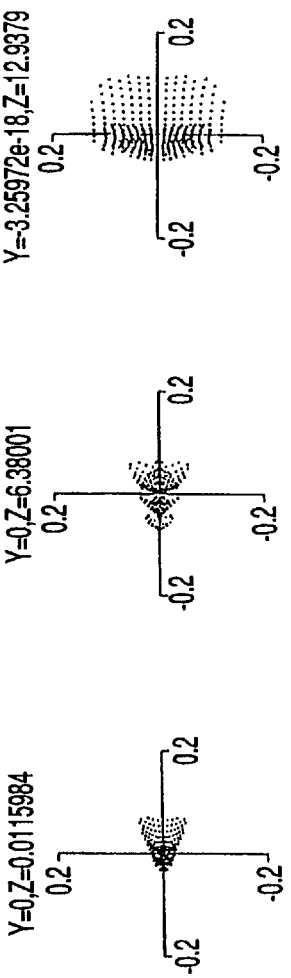
FIG. 12p Y=0,Z=0.0115984
FIG. 12q Y=0,Z=6.38001
FIG. 12r Y=-3.25972e-18,Z=12.9379

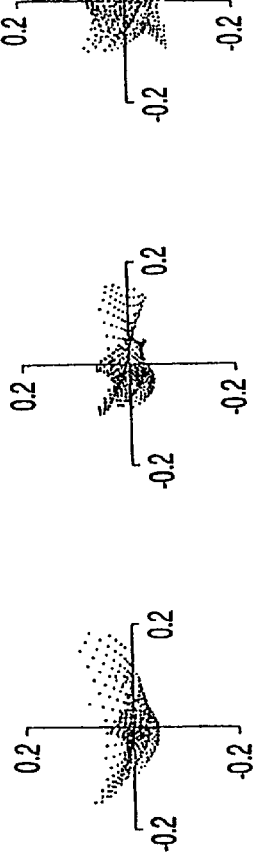
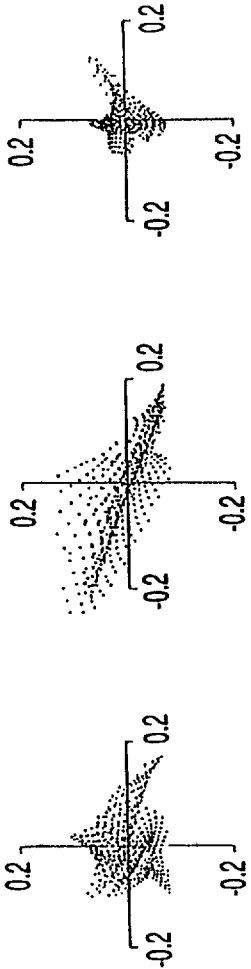
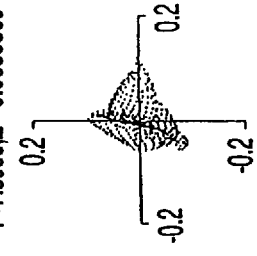
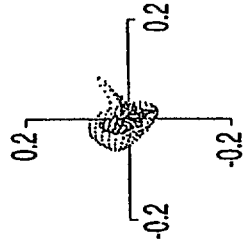
FIG. 13a Y=11.0945,Z=-6.63276
FIG. 13b Y=11.0505,Z=-0.164053
FIG. 13c Y=11.0755,Z=-6.26629
FIG. 13d Y=7.54733,Z=-13.3417
FIG. 13e Y=7.45911,Z=-6.55696
FIG. 13f Y=7.3995,Z=-0.0688509
FIG. 13g Y=7.3817,Z=-6.34114
FIG. 13h Y=7.49842,Z=-12.9648
FIG. 13i Y=3.76539,Z=-13.221
FIG. 13j Y=3.72137,Z=-6.52601

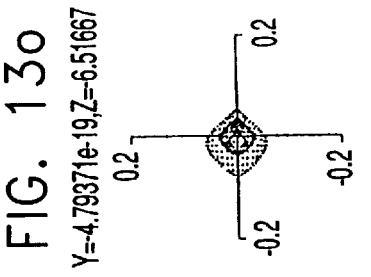
FIG. 13k
Y=3.68119,Z=0.00169816
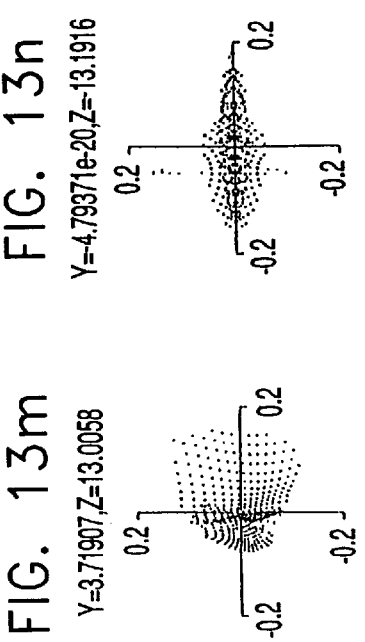
FIG. 13l
Y=3.66292,Z=6.39246
FIG. 13m
Y=3.71907,Z=13.0058
FIG. 13n
Y=-4.79371e-20,Z=13.1916
FIG. 13o
Y=-4.79371e-19,Z=-6.51667
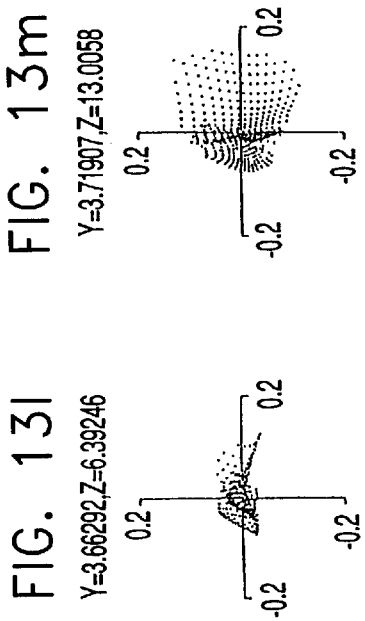
FIG. 13p
Y=-9.58742e-20,Z=0.0240484
FIG. 13q
Y=-9.58742e-19,Z=6.41214
FIG. 13r
Y=1.91748e-19,Z=13.0241
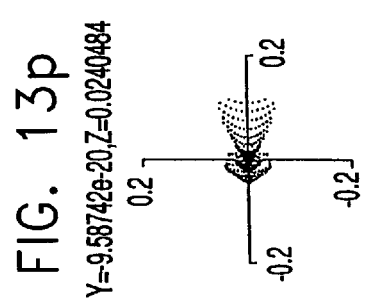
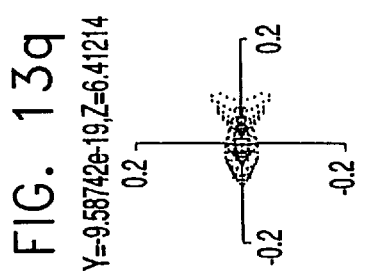
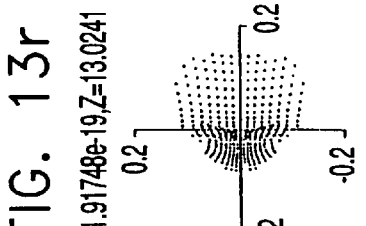

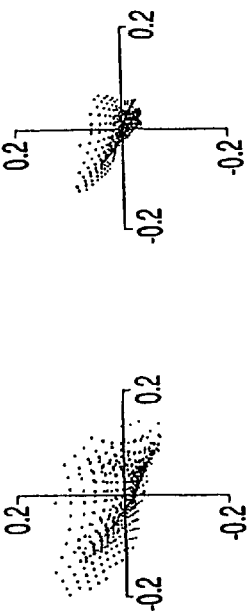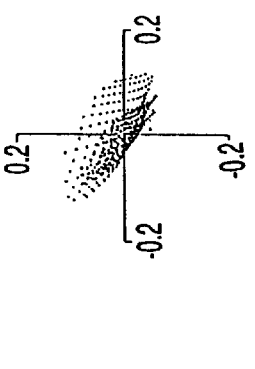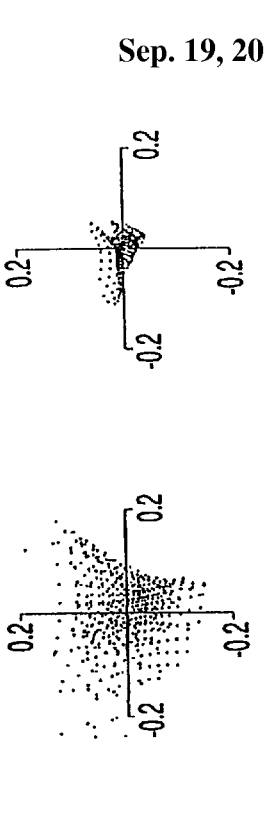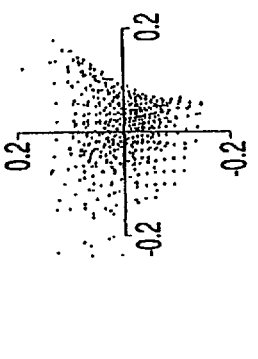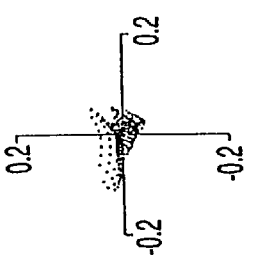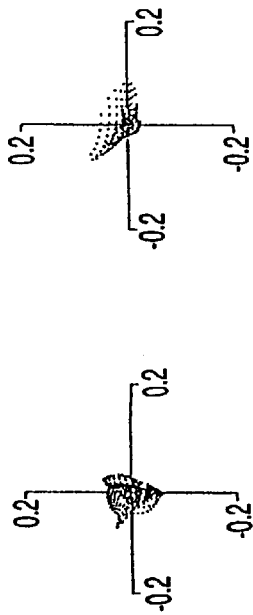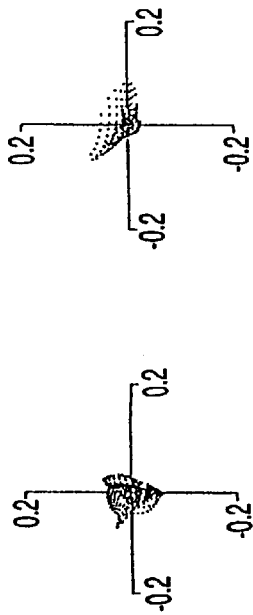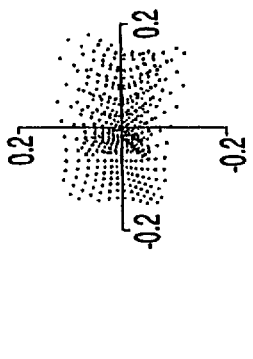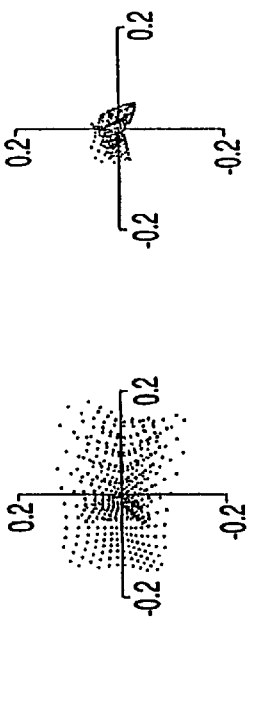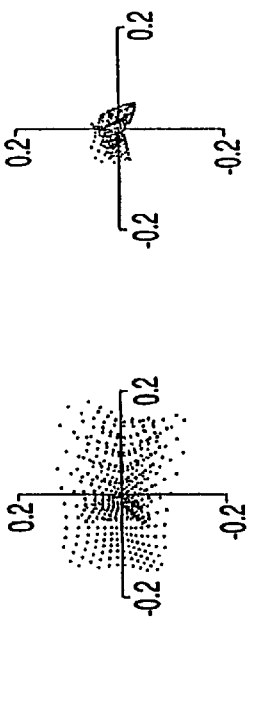
FIG. 14a Y=10.9568,Z=6.49539
FIG. 14b Y=10.991,Z=0.169269
FIG. 14c Y=11.0156,Z=6.19322
FIG. 14d Y=7.29758,Z=-12.7137
FIG. 14e Y=7.40698,Z=6.47948
FIG. 14f Y=7.38263,Z=-0.0810528
FIG. 14g Y=7.34939,Z=6.26905
FIG. 14h Y=7.44196,Z=-12.7838
FIG. 14i Y=3.66519,Z=-12.7165
FIG. 14j Y=3.70251,Z=-6.4717

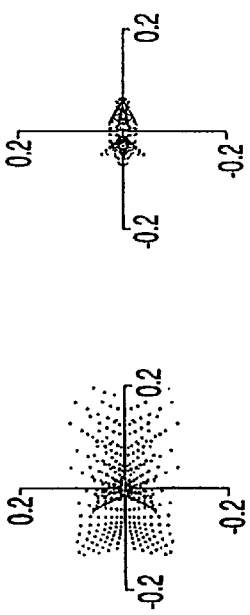
FIG. 14k Y=3.67658,Z=-0.0196247
FIG. 14l Y=3.64805,Z=6.33054
FIG. 14m Y=3.69209,Z=12.8351
FIG. 14n Y=-7.66993e-19,Z=12.7325
FIG. 14o Y=-1.43811e-19,Z=-6.46752
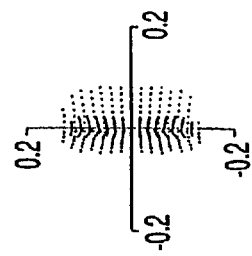
FIG. 14p Y=0,Z=-0.0010716
FIG. 14q Y=1.82161e-18,Z=6.35467
FIG. 14r Y=2.68448e-18,Z=12.8527

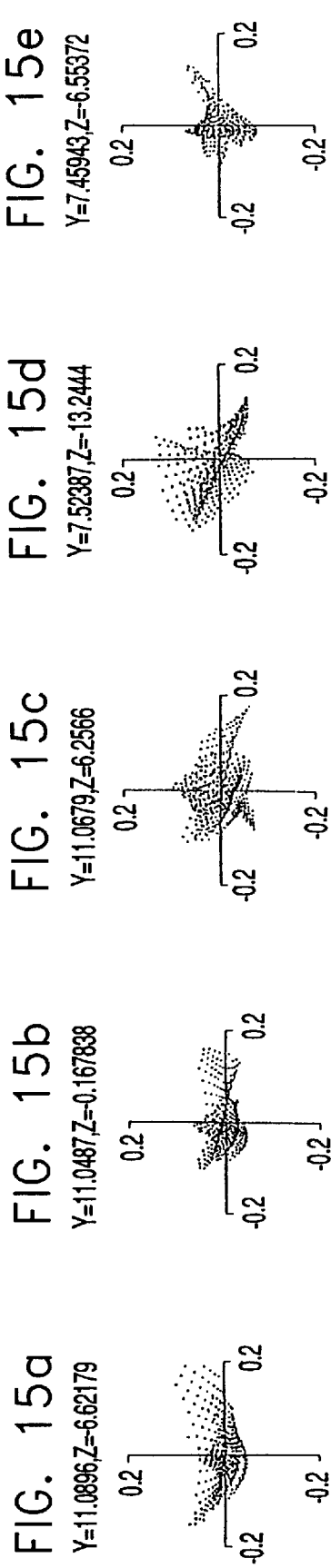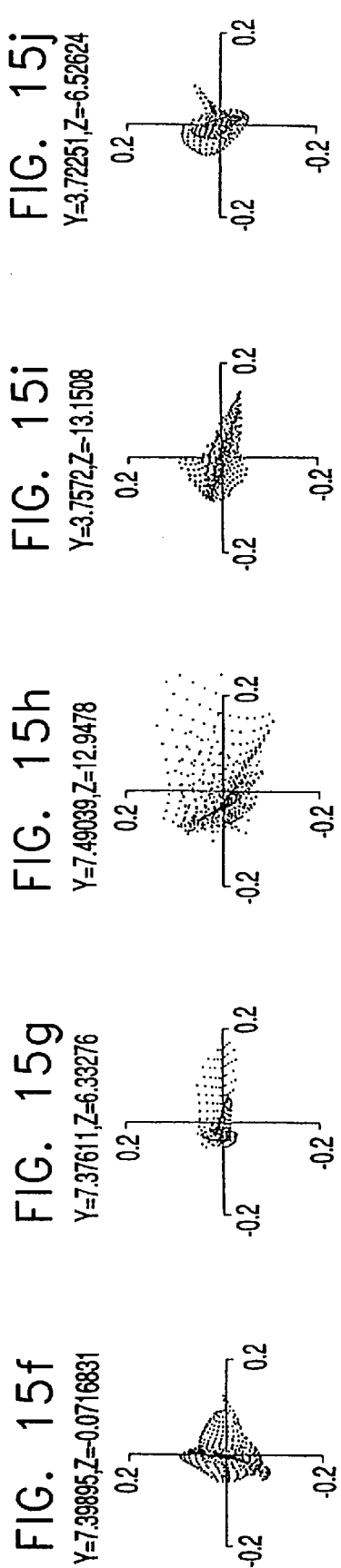

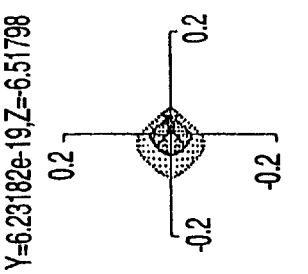
FIG. 15k
Y=3.68109,Z=-0.000597623
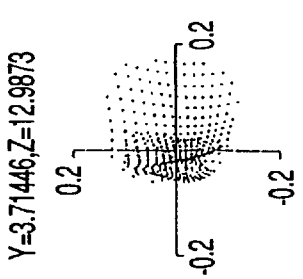
FIG. 15l
Y=3.65996,Z=6.38496
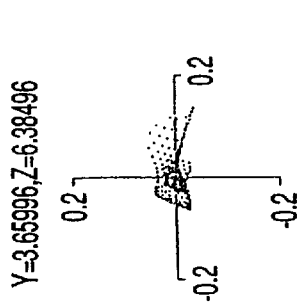
FIG. 15m
Y=3.71446,Z=12.9873
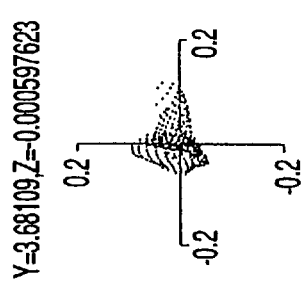
FIG. 15n
Y=6.71119e-19,Z=13.1279
FIG. 15o
Y=6.23182e-19,Z=6.51798
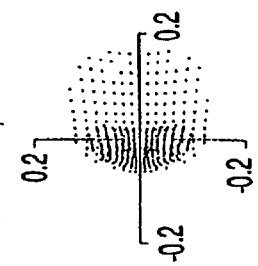
FIG. 15p
Y=1.10255e-18,Z=0.0221665
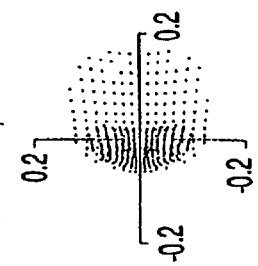
FIG. 15q
Y=0,Z=6.40497
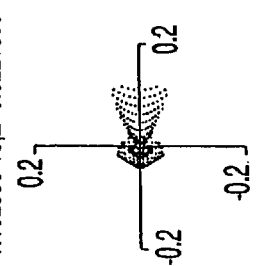
FIG. 15r
Y=3.06797e-18,Z=13.0052
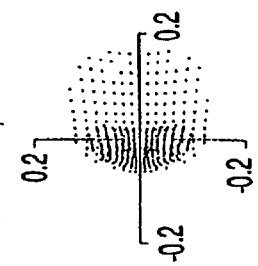

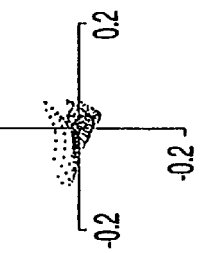 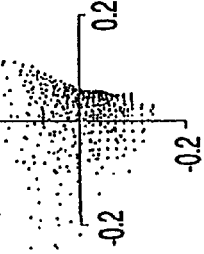 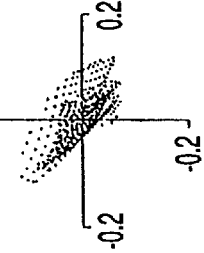 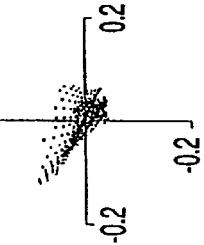 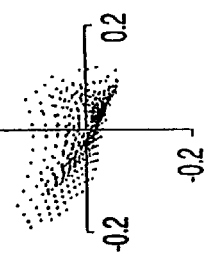
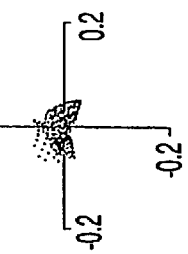 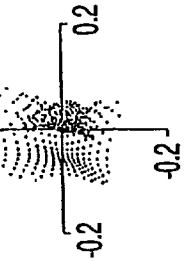 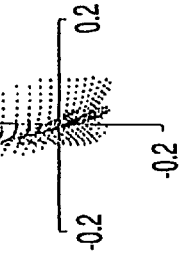 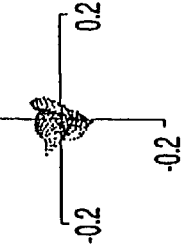
FIG. 16a Y=10.9656, Z=-6.51326
FIG. 16b Y=10.9945, Z=-0.166102
FIG. 16c Y=11.0256, Z=6.20517
FIG. 16d Y=7.32507, Z=-12.8361
FIG. 16e Y=7.40926, Z=-6.48854
FIG. 16f Y=7.38381, Z=-0.0777106
FIG. 16g Y=7.35557, Z=6.27897
FIG. 16h Y=7.4527, Z=12.8084
FIG. 16i Y=3.67658, Z=-12.818
FIG. 16j Y=3.70268, Z=-6.47661

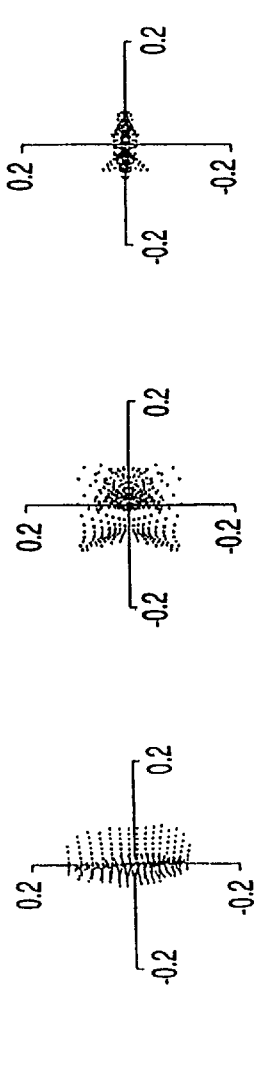
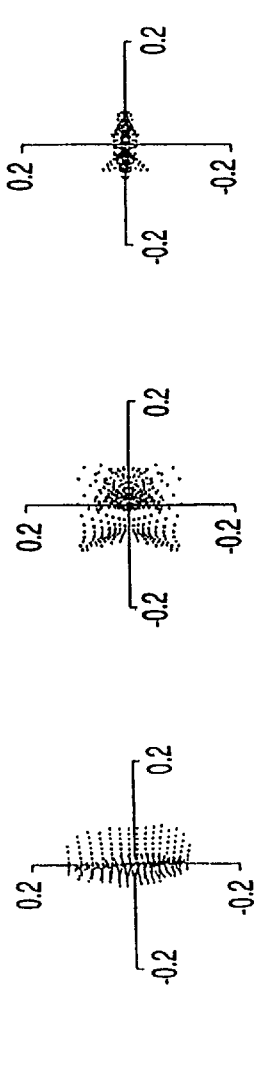
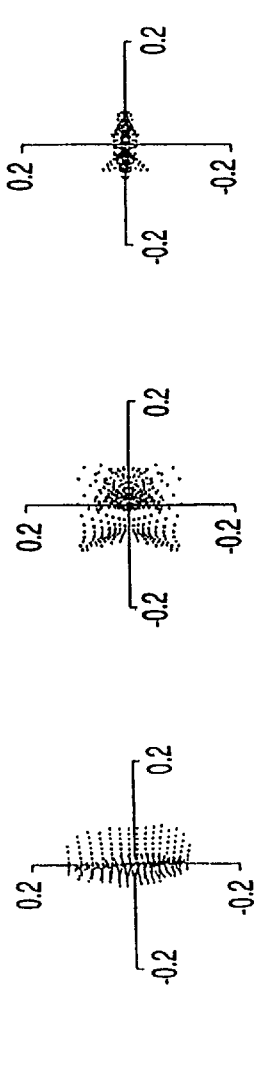
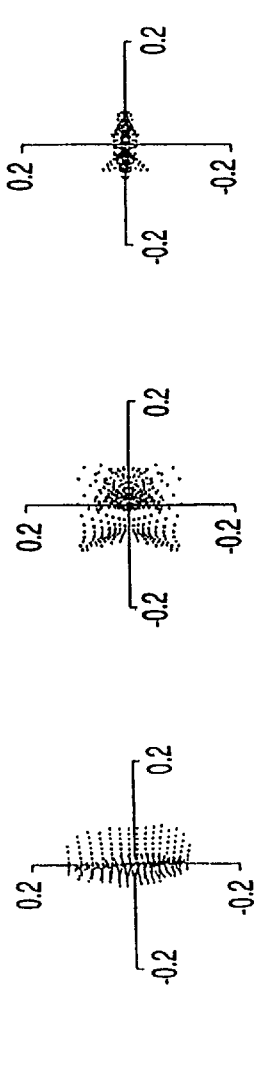
FIG. 16k Y=3.67686,Z=0.01665
FIG. 16l Y=3.65118,Z=6.33907
FIG. 16m Y=3.69786,Z=12.86
FIG. 16n Y=1.34224e-18,Z=12.8268
FIG. 16o Y=-4.79371e-20,Z=-6.47118
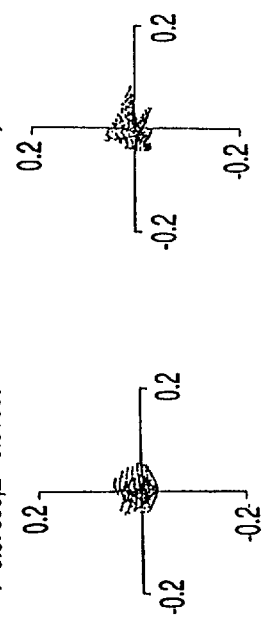
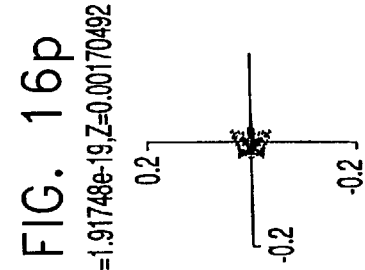
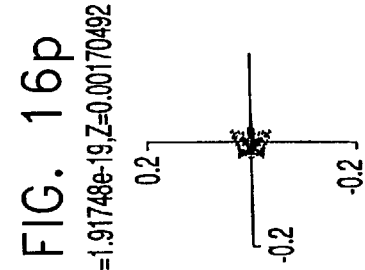
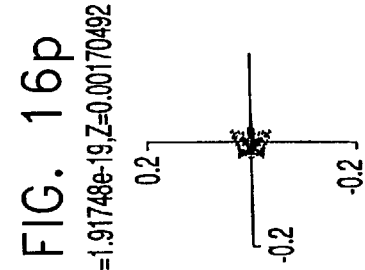
FIG. 16p Y=1.91748e-19,Z=0.00170492
FIG. 16q Y=-3.83497e-19,Z=6.36269
FIG. 16r Y=-1.72574e-18,Z=12.8777

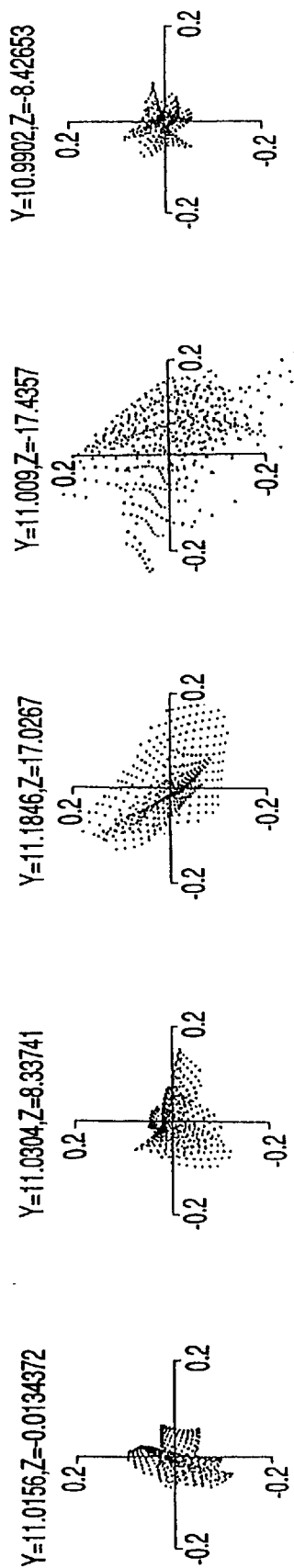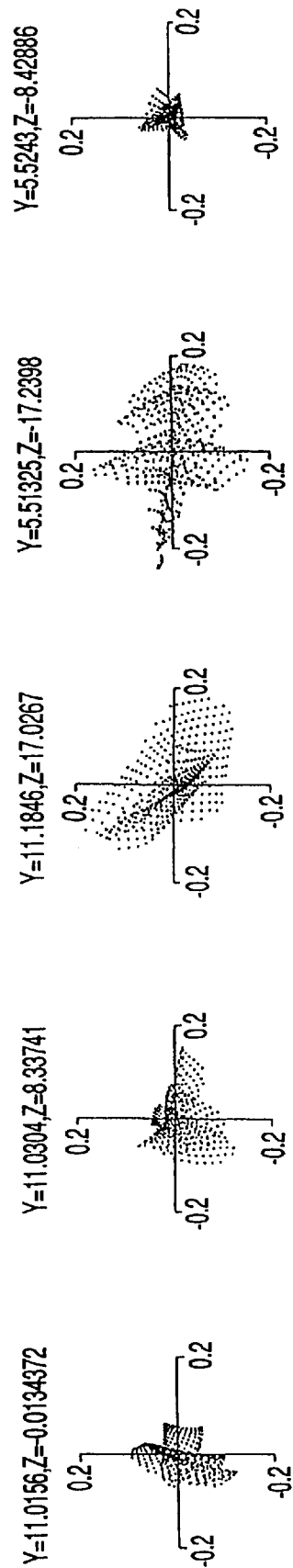

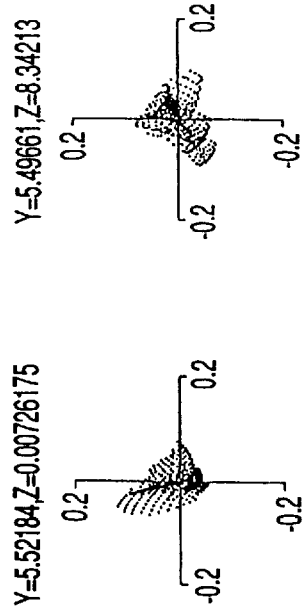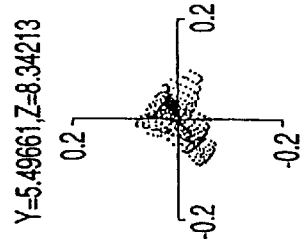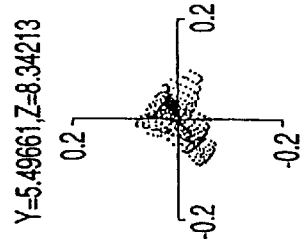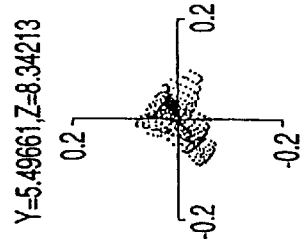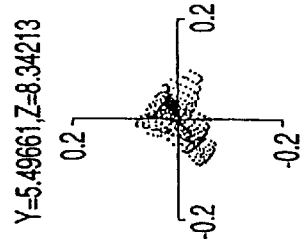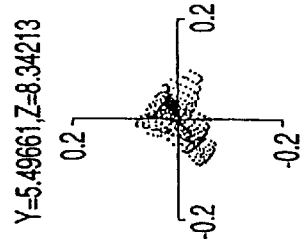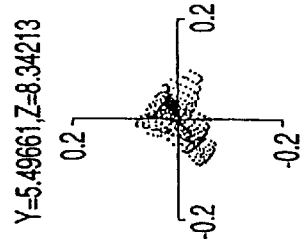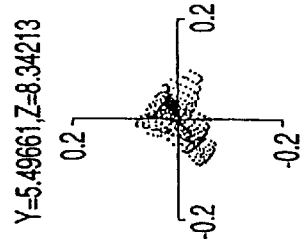
FIG. 26k  Y=5.52184,Z=-0.00726175
FIG. 26l  Y=5.49661,Z=-8.34213
FIG. 26m  Y=5.56727,Z=17.0087
FIG. 26n  Y=1.34224e-18,Z=-17.2012
FIG. 26o  Y=-6.71119e-19,Z=-8.42339
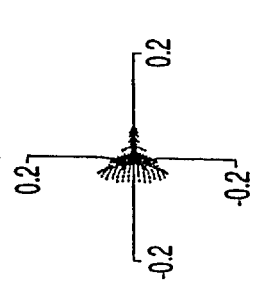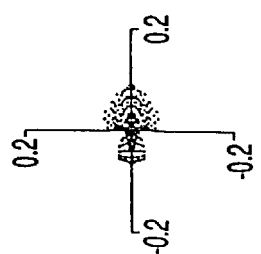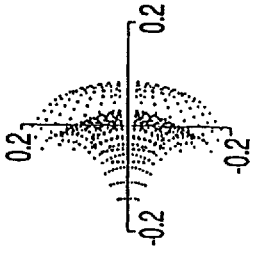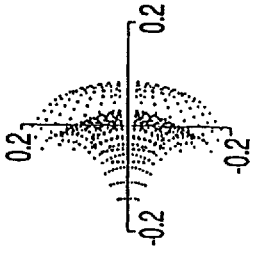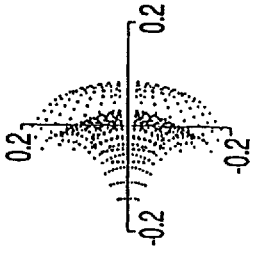
FIG. 26p  Y=-1.91748e-19,Z=-0.00154834
FIG. 26q  Y=3.83497e-19,Z=8.34896
FIG. 26r  Y=-7.66993e-19,Z=17.0037

VIEWFINDER OPTICAL SYSTEM

This application is based on applications Nos. H10-004681, H10-006377, H10-006380, H10-006387 and H10-006398 filed in Japan, the contents of which are hereby incorporated by reference.

BACKGROUND OF THE INVENTION

1. Field of the Invention

The present invention relates to an optical system constituting a viewfinder of a camera and the like.

2. Description of the Prior Art

Various technologies as shown below have been disclosed to improve the performance of an optical system for displaying images. For example, as described in Japanese Laid-open Patent Application No. H8-292371, the entire optical system is formed in one block with a concave back-surface-reflecting mirror comprising an eyepiece optical system and a relay optical system which are integral with each other, thereby reducing the mirror optical system in size and lowering the disposition precision required of the reflecting mirror.

Moreover, as described in Japanese Laid-open Patent Application No. H7-234376, in order to correct the diopter of a picture display apparatus, at least one of the following optical elements is made movable: the display screen of the picture display apparatus; the optical surface of a relay optical system; the optical surface of a decentering correcting optical system; and the optical surface of an eyepiece optical system. Particularly, the reflecting surface of the eyepiece optical system is moved.

Moreover, as described in Japanese Laid-open Patent Application No. H9-222564, as an erecting optical system being compact compared with conventional erecting optical systems, an optical system has, between a principal ray parallelized lens and an eyepiece, two parabolic mirrors substantially sharing the focal point and the axis and being arranged so that the concave surfaces thereof face each other, and an image plane control lens having curvature of field in the vicinity of the focal point thereof.

However, the optical system as described in Japanese Laid-open Patent Application No. H8-292371 is difficult to manufacture because there are a plurality of reflecting surfaces in one block. The optical system as described in Japanese Laid-open Patent Application No. H7-234376 is difficult to adjustment because a reflecting surface which is generally high in error sensitivity is moved. The optical system as described in Japanese Laid-open Patent Application No. H9-222564 is difficult to structure because the reflecting surface is limited to the parabolic surface.

SUMMARY OF THE INVENTION

In view of the above-mentioned problems, an object of the present invention is to provide a viewfinder optical system capable of effectively correcting aberrations and capable of performing diopter adjustment with little variation in magnification and little variation in aberration with a compact mechanism.

Another object of the present invention is to provide a viewfinder optical system in which an unnecessary luminous flux is limited to improve performance.

Yet another object of the present invention is to provide a compact, low-cost and high-performance viewfinder optical system.

Still another object of the present invention is to provide a compact and low-cost viewfinder optical system capable of effectively correcting aberrations.

BRIEF DESCRIPTION OF THE DRAWINGS

These and other objects and features of this invention will become clear from the following description, taken in conjunction with the preferred embodiments with reference to the accompanied drawings in which:

FIG. 8 is a view of the nonaxisymmetric optical system at the time of diopter adjustment (rotation, near side) (second embodiment);

FIG. 9 is a view of assistance in explaining movement for diopter adjustment of the nonaxisymmetric optical system (linear movement) (second embodiment);

FIGS. 11a–11o show spot diagrams of the nonaxisymmetric optical system using only axisymmetric lens elements (first embodiment);

FIG. 12a–12r show spot diagrams of the nonaxisymmetric optical system (−1D) (second embodiment);

FIG. 13a–13r show spot diagrams of the nonaxisymmetric optical system (linear movement, far side) (second embodiment);

FIG. 14a–14r show spot diagrams of the nonaxisymmetric optical system (linear movement, near side) (second embodiment);

FIG. 15a–15r show spot diagrams of the nonaxisymmetric optical system (rotation, far side) (second embodiment);

FIG. 16a–16r show spot diagrams of the nonaxisymmetric optical system (rotation, near side) (second embodiment);

DESCRIPTION OF THE PREFERRED EMBODIMENTS

In the specification, the terms "optical power" or "power" means a quantity which are defined by the reciprocal of a focal length, and includes not only the deflection in the faces of media having refractive indices of different deflection functions, but also the deflection due to diffraction, the deflection due to the distribution of refractive index in a medium, and the like. Furthermore, the term "refractive power" means a quantity which belongs to the above-mentioned "power", and which is particularly due to a deflection function generated in an interface between media having different refractive indices. Hereinafter, embodiments of the present invention will be described with reference to the drawings. First, absolute coordinates are defined as follows: The origin of absolute coordinates (X, Y, Z)=(0, 0, 0) is set at the center of the design pupil. Here, X is vertical to the pupil surface and the direction of the light incident on the optical system from the point at the center of the pupil is positive. Z is a direction in which the optical system is decentered and that is situated on the pupil surface. Y is a coordinate vertical to X and Z. Local coordinates are represented by coordinates from the origin of the absolute coordinates and the angles of decentering from the X axis (decentering about the Y axis in the Z direction with the counterclockwise direction as the positive direction).

A nonaxisymmetric viewfinder optical system of the present invention is decentered only in the Z direction. Therefore, in the optical system of the present invention, the Y component is symmetrical on the X-Z plane (plane of Y=0). Tables 1 and 2 show the performance of the viewfinder optical system of each construction. The details of the constructions will be described later.

The viewfinder magnification is related not only to the magnification of the viewfinder optical system but also to the focal length of the objective lens system (taking lens system). Here, the viewfinder magnification is obtained by use of the value of the focal length F1 shown in the remarks column. In a decentered optical system, the lateral magnification in the decentering direction (here, Z direction) and the lateral magnification in the direction vertical to the decentering direction (here, Y direction) generally disagree with each other. Here, the viewfinder magnification is the average of the magnification in the Z direction and the magnification in the Y direction. The anamorphic ratio is the ratio between the magnifications in the Z and Y directions.

As is apparent from these tables, the optical systems of the present invention secure high magnifications as viewfinder optical systems. In addition, with the anamorphic ratio restrained to several percent or lower, the viewfinder optical systems have little distortion.

Figure 1:
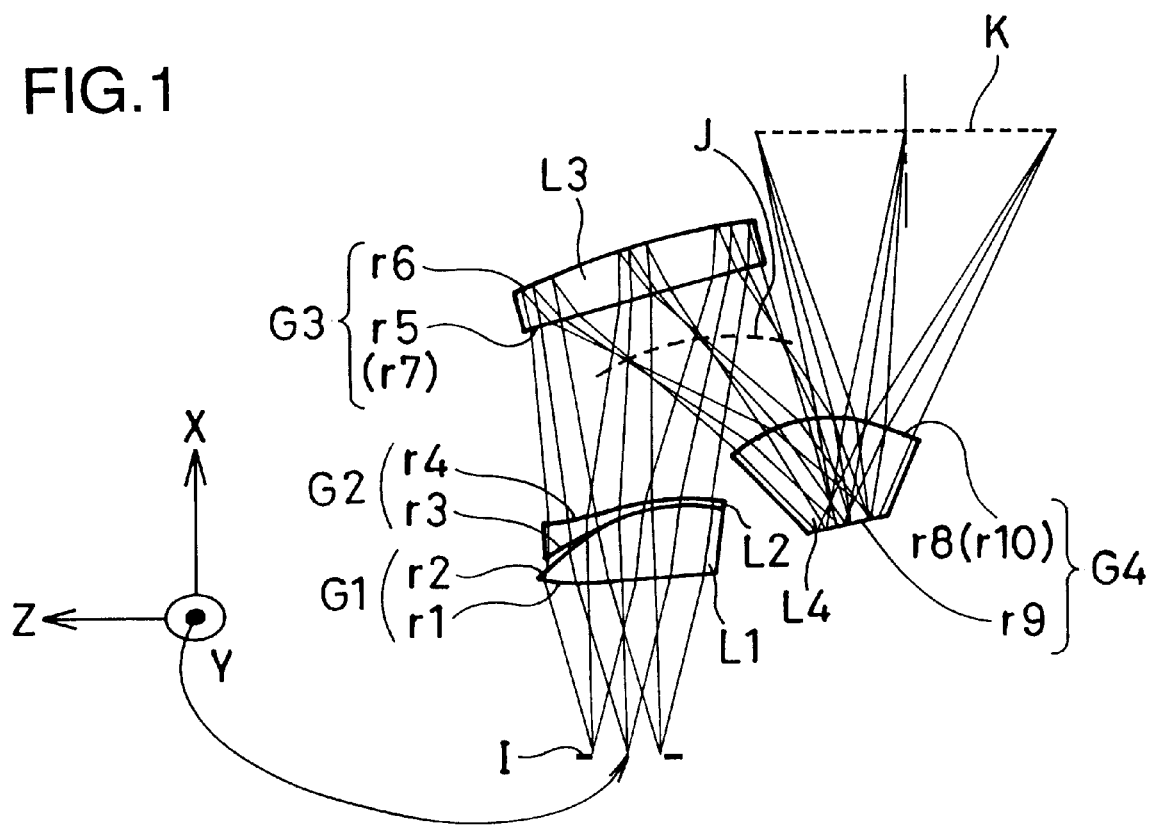
FIG. 1 is a view of a nonaxisymmetric optical system using only axisymmetric lens elements (first embodiment)

FIG. 1 shows a nonaxisymmetric optical system using only axisymmetric lens elements (arranged with their optical axes decentered from one another). The optical system of FIG. 1 is according to a first embodiment. As shown in the figure, light emanating from an image plane K is incident on a tenth surface r10 of a fourth lens unit G4 of a relay lens, is reflected at a ninth surface r9, and passes through an eighth surface r8 (the same as the tenth surface r10) to form a real image thereof on a relay image plane J. The fourth lens unit G4 comprises one lens element L4.

Figure 2:
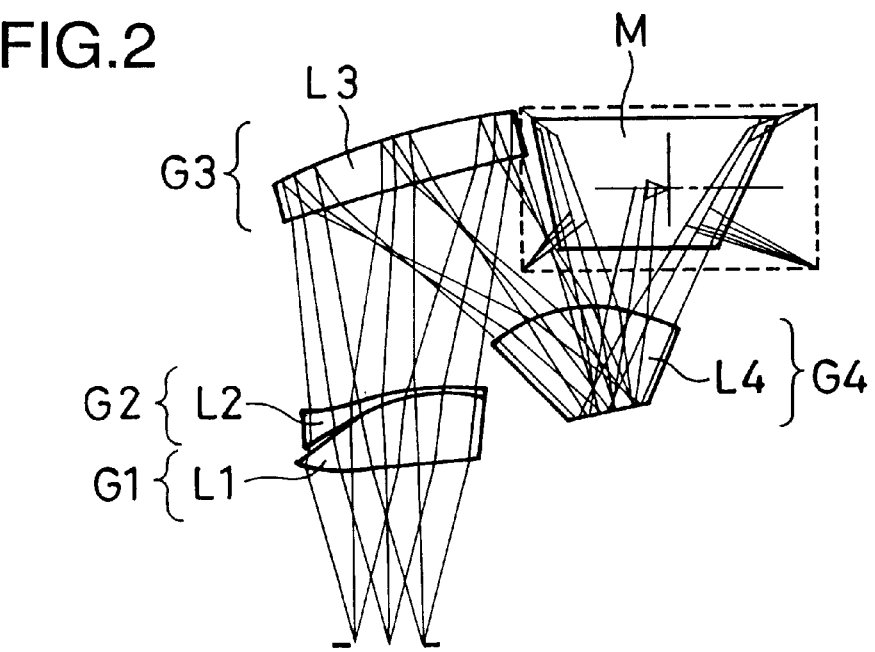
FIG. 2 is a view of a nonaxisymmetric optical system using only axisymmetric lens elements (with a mirror) (first embodiment)

An eyepiece unit comprises a third lens unit Gr3 having a positive optical power, a second lens unit G2 having a negative optical power and a first lens unit G1 having a positive optical power. The first, the second and the third lens units G1, G2 and G3 each comprise one lens element L1, L2 or L3. The light from the relay optical system is incident on a seventh surface r7 of the third lens unit G3, is reflected at a sixth surface r6, and passes through a fifth surface r5 (the same as the seventh surface r7) to be directed to the second lens unit G2. Then, the light is incident on a fourth surface r4 of the second lens unit G2, exits from a third surface r3, is incident on a second surface r2 of the first lens unit G1, and exits from a first surface r1 to reach a pupil surface I. FIG. 2 shows an arrangement in which a mirror M is disposed immediately at the back of the image plane K.

Tables 3 and 4 show construction data and aspherical coefficients of the first embodiment, respectively. The coordinate system used here is shown in FIG. 1. With respect to the angle, the counterclockwise direction about the Y axis is the positive direction with the direction vector of the X axis as the reference. The Y coordinates of the surfaces are all 0. The coordinates and the angles of the surfaces are set at the coordinate references of the pupil surface I.

The radii of curvature of the surfaces shown in Table 3 are represented by the distances from the vertices to the centers of curvature of the surfaces by using as the references the direction vectors represented by the coordinate systems where the surfaces are situated and the angles. The surfaces for which no coordinate systems are defined are situated in positions advanced by the distances shown in the distance columns in the directions of the direction vectors shown in the preceding coordinate systems. The coordinates of the aperture diaphragm surface existing on the reflecting surface represents the central position of the diaphragm. The coordinate system is the same for other optical systems described later. In the tables, E–n (n is a number) represents ×10–n.

The aspherical surfaces are expressed by the following expression:

$$\begin{cases} x = f(\Phi) = C_0\Phi^2 / \left\{1 + \sqrt{(1-\varepsilon C_0^2\Phi^2)}\right\} + \sum_{i}^{\infty} A_i\Phi^i \\ \Phi^2 = y^2 + z^2 \end{cases}$$

where x is the displacement from the vertex of the aspherical surface in a direction parallel to the optical axis of the aspherical surface, $\Phi$ is the distance from the vertex of the aspherical surface in a direction vertical to the optical axis of the aspherical surface $\{=\sqrt{(y^2+z^2)}\}$, CO is the curvature at the vertex of the aspherical surface, $\varepsilon$ is the quadric surface parameter, and Ai is the i-th aspherical curvature.

Figure 3:
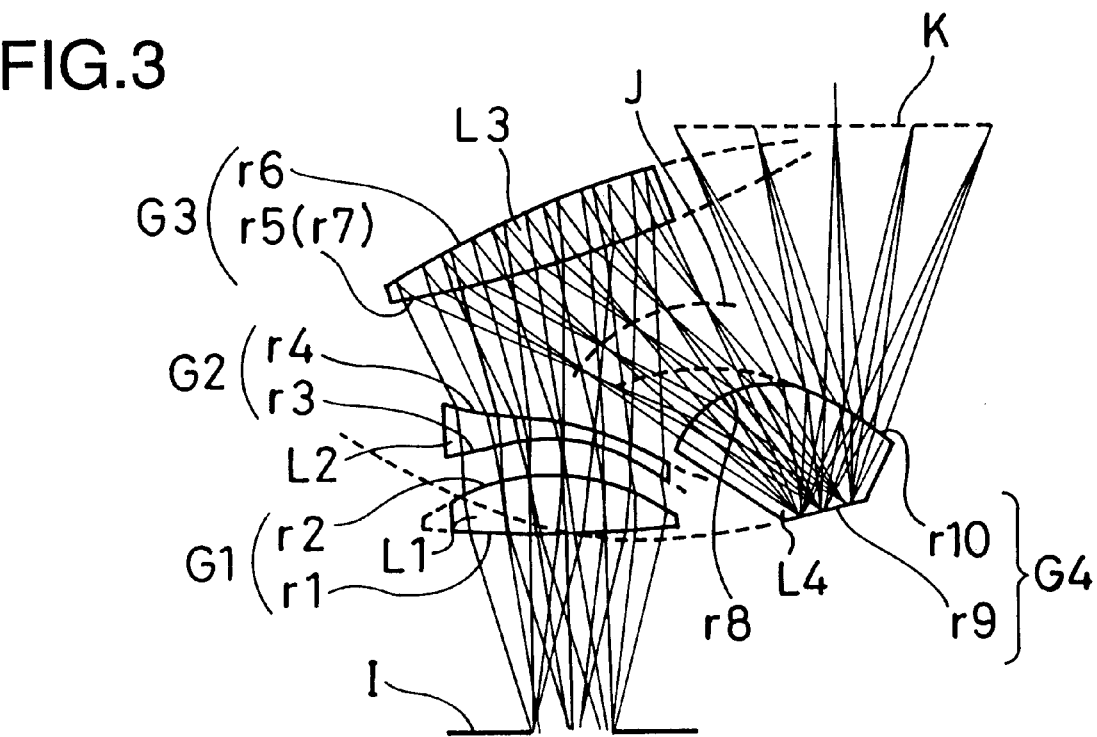
FIG. 3 is a view of a nonaxisymmetric optical system (second embodiment)

FIG. 3 shows a nonaxisymmetric optical system. The optical system of FIG. 3 is according to a second embodiment. As shown in the figure, light emanating from the image plane K is incident on a tenth surface r10 of a fourth lens unit G4 of a relay lens, is reflected at a ninth surface r9, and passes through an eighth surface r8 to form a real image thereof on a relay image plane J.

The fourth lens unit G4 comprises one lens element L4.

Figure 4:
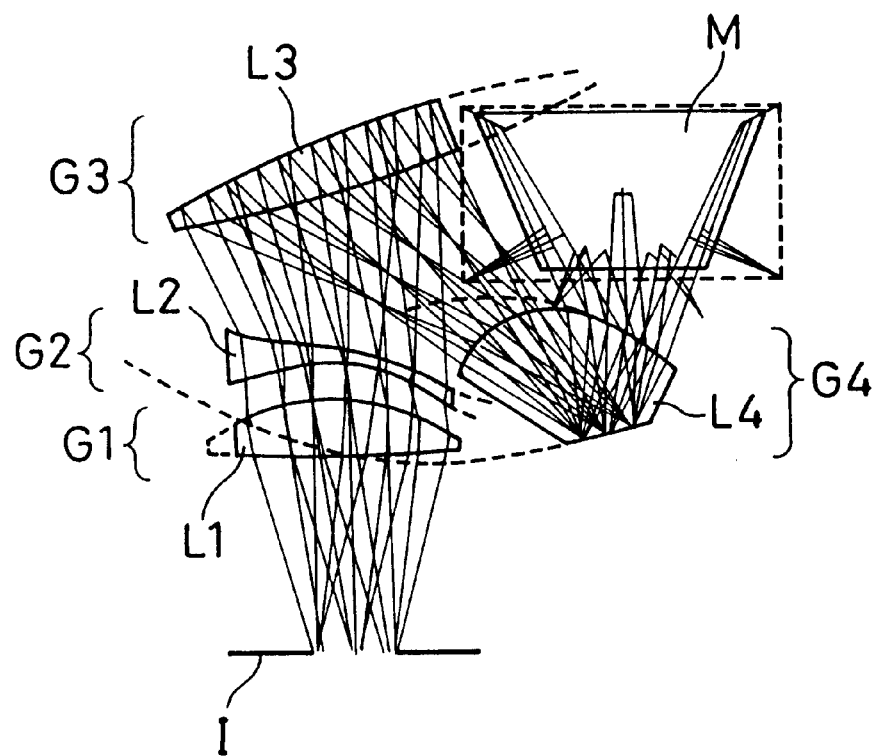
FIG. 4 is a view of a nonaxisymmetric optical system (with a mirror) (second embodiment)

An eyepiece unit comprises a third lens unit G3 having a positive optical power, a second lens unit G2 having a negative optical power and a first lens unit G1 having a positive optical power. The first, the second and the third lens units G1, G2 and G3 each comprise one lens element L1, L2 or L3. The light from the relay optical system is incident on a seventh surface r7 of the third lens unit G3, is reflected at a sixth surface r6, and passes through a fifth surface r5 (the same as the seventh surface r7) to be directed to the second lens unit G2. Then, the light is incident on a fourth surface r4 of the second lens unit G2, exits from a third surface r3, is incident on a second surface r2 of the first lens unit G1, and exits from a first surface r1 to reach a pupil surface I. FIG. 4 shows an arrangement in which a mirror M is disposed immediately at the back of the image plane K.

Figure 10:
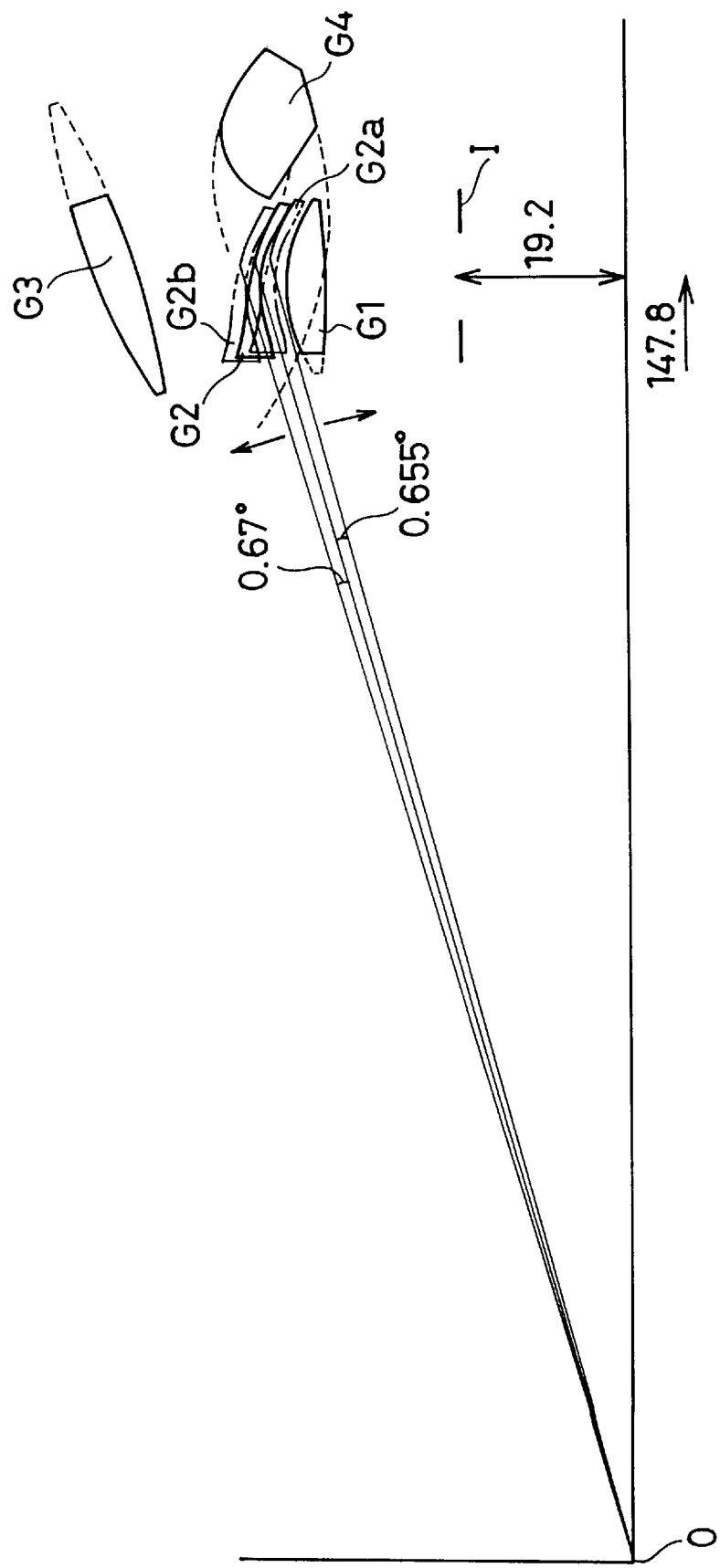
FIG. 10 is a view of assistance in explaining movement for diopter adjustment of the nonaxisymmetric optical system (rotation) (second embodiment)

Tables 5, 6 and 7 show construction data, construction data at the time when diopter adjustment is performed by rotation, and aspherical coefficients of the second embodiment, respectively. The coordinates of the second lens unit G2 at the time of diopter adjustment are as shown in Table 6. The coordinates correspond to a position of the second lens unit G2 having been rotated by 0.6550 (the diopter near side) and by +0.67° (the diopter far side) about the Y axis with a point away from the coordinates of the image surface I by (x, z)=(−19.2, 147.8) as the center. This is shown in FIG. 10 described later.

Concrete structures of the above-mentioned constructions will be described. The tenth surface r10 inclines in the vicinity of the intersection of the tenth surface r10 and the eighth surface r8 so that the light incident on the tenth surface r10 is refracted in the Z direction (direction which is the direction of decentering and that approaches the pupil). When the tenth surface r10 is not arranged in such a manner, it is necessary for the decentering amount of the ninth surface r9 to be larger in order to prevent the light incident on the tenth surface r10 and the light incident on the eighth surface r8 from intersecting each other. Generally, the larger the decentering amount is, the larger the aberration caused by the decentering is, so that the performance deteriorates. Therefore, in order to reduce the decentering amount, the tenth surface r10 is arranged as mentioned above.

The ninth surface r9 comprises a reflecting surface so that the light from the tenth surface r10 is reflected toward the eighth surface r8. The reflecting surface of the ninth surface r9 can be formed by aluminum deposition. It is preferable for the ninth surface r9 to be situated in a position substantially conjugate with the pupil. With this, by limiting the reflecting range of the reflecting surface, a function as a diaphragm for intercepting unnecessary light can be provided, so that the image quality can be maintained excellent. Thus, the diaphragm is disposed at the ninth surface r9 in this embodiment.

Figure 28A:
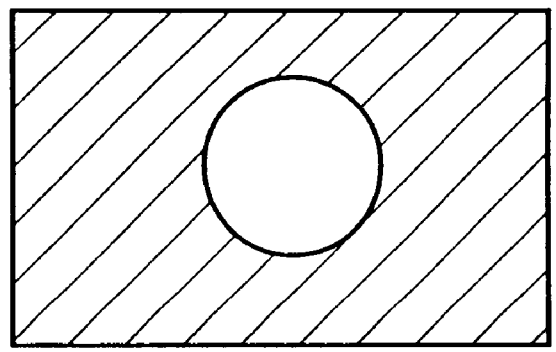
Figure 28B:
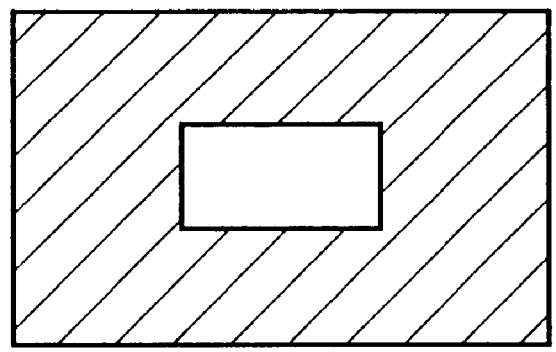
Figure 28C:
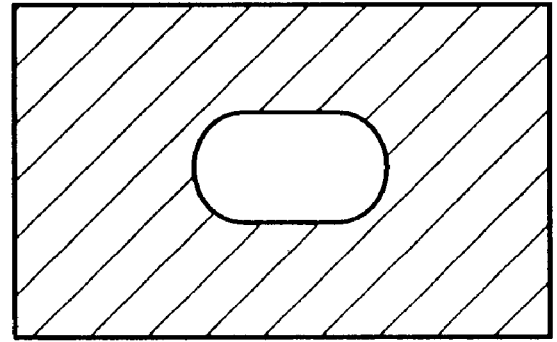

The diaphragm may be circular as shown in FIG. 28A or may be rectangular as shown in FIG. 28B. Moreover, the diaphragm may have an elliptic shape elongated in the horizontal direction as shown in FIG. 28C. With this, the size of the viewfinder optical system along the height can be reduced. In order to increase the image quality of the finder, it is also preferable for the diaphragm to have an elliptic shape elongated in the vertical direction.

As a concrete structure of the diaphragm, reflection is restrained in the hatched parts of FIGS. 28A to 28C, whereas reflection is facilitated in the blank parts. To restrain reflection, ink is applied so that light is absorbed, or a coating that increases the transmittance is applied. To facilitate reflection, the optical system is structured so as to achieve total reflection, or aluminum or silver is deposited to increase the reflectance. The reflectance may be increased by use of a multilayer dielectric film.

As a concrete value of the reflectance, when the reflectance within a reflection necessary range where reflection should be facilitated is Ri and the reflectance outside the reflection necessary range where reflection should be restrained is Ro, it is preferable that $$Ri/Ro>10.$$

With this, the influence of the unnecessary luminous flux outside the reflection necessary range can be made inconspicuous. In order to further improvle the performance, it is preferable that Ri>50% and Ro<5%.

It is preferable for the reflecting surface to be a concave reflecting surface having a positive optical power. With this, the image quality can be improved. It is preferable for the number of reflecting surfaces to be one. Although a plurality of reflecting surfaces are provided in some conventional examples, in the present invention, only one reflecting surface is provided win one lens unit. The reason therefor is as follows: Since a reflecting surface generally has an error sensitivity three to four times higher than that of a transmitting surface, when a plurality of reflecting surfaces are provided, the error caused at the time of assembly increases, so that manufacture is difficult. The optical systems of the present invention are easy to manufacture because only one reflecting surface is provided.

The eighth surface r8 comprises a surface convex to the relayed image plane K. The tenth surface r10 and the eighth surface r8 both have a positive optical power here. Thus, it is preferable for at least one of the incident and the exit surfaces to have a positive optical power. With this, the positive optical power necessary as a relay optical system can be dispersed, so that the aberration performance can be improved. Thus, by forming a single lens element in which the incident and the exit surfaces have different curvatures and the incident luminous flux is reflected at the reflecting surface having a further different curvature, a compact and low-cost relay optical system can be structured. When the Abbe number of the single lens element to the d-line is νd, it is preferable that $$30<\nu d<70.$$

When the Abbe number is great, color dispersion is small and variation in image quality due to the wavelength of the ray is small, so that it is easy to secure the necessary performance. However, when the Abbe number is too great, the material is expensive and the processing by molding is difficult, so that the cost increases.

When the radius of curvature of the reflecting surface is CR, it is preferable that $$|CR|<100.$$

With this, a positive optical power necessary for the reflecting surface can be provided, so that the performance can be improved.

The third lens unit G3 comprises a back-surface-reflecting lens in which the sixth surface r6 is the reflecting surface, and is disposed so as to be inclined so that the light coming from the eighth surface r8 exits toward the eyepiece. Here, the sixth surface r6 is a reflecting surface having a positive optical power. Generally, when the focal length is the same, a back-surface-reflecting surface can have a gentle radius of curvature compared with a front-surface-reflecting surface, so that excellent performance can be secured. While the lens element comprises an axisymmetric lens element (lens in which the optical axes of the seventh surface r7 and the sixth surface r6 coincide with each other), it may comprise a decentered lens as necessary.

When the radius of curvature of the reflecting surface is CR, it is preferable that $$|CR|<200.$$

With this, positive power can be appropriately distributed to the reflecting surface, so that necessary image quality can be secured.

The remaining two lens units of the eyepiece are a second lens unit G2 including at least one surface having a negative optical power and a first lens unit G1 including at least one surface having a positive optical power. Here, when the Abbe number to the d-line is νd, it is preferable to use for the lens element of the second lens unit G2 a lens material having an Abbe number such that $20<vd<40.$ Thus, by selecting a material with large dispersion, chromatic aberration can be effectively corrected. The material may be a plastic material or may be a glass material.

By the third surface r3 of the second lens unit G2, i.e. the last surface (the most pupil side surface) of the second lens unit G2 being a surface having a negative optical power (i.e. a surface convex to the side of the image plane K), excellent performance can be secured even when diopter adjustment is performed.

Figure 5:
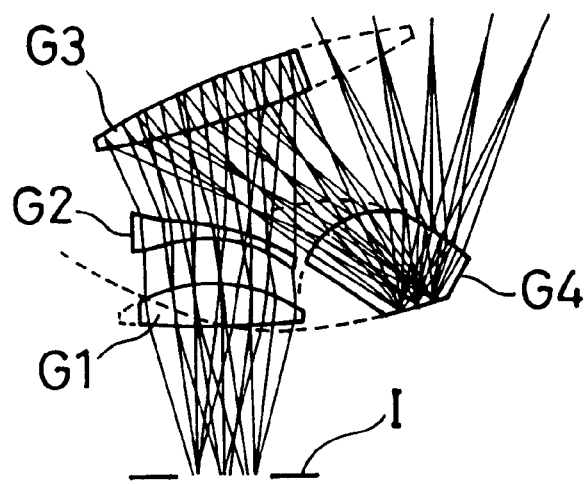
FIG. 5 is a view of the nonaxisymmetric optical system at the time of diopter adjustment (linear movement, far side) (second embodiment)
Figure 6:
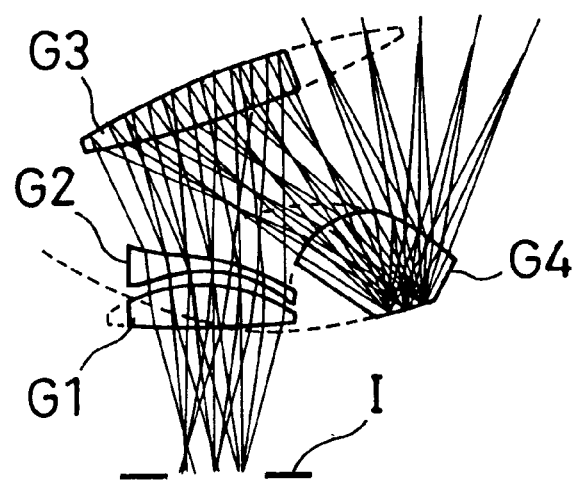
FIG. 6 is a view of the nonaxisymmetric optical system at the time of diopter adjustment (linear movement, near side) (second embodiment)

By the second lens unit G2 being movable, diopter adjustment can be effectively performed. That is, by the second lens unit G2 being movable, an optical system is obtained in which variation in viewfinder magnification is small and variation in aberration is small. When the second lens unit G2 is moved, it is preferable to move it linearly in order to simplify the mechanism for moving it. FIGS. 5 and 6 illustrating the nonaxisymmetric optical system at the time of the diopter adjustment, show the second lens unit G2 of the second embodiment moved toward the far side and toward the near side, respectively. FIGS. 5 and 6 represent the diopter far side and the diopter near side, respectively.

At this time, by moving the second lens unit G2 in a direction substantially parallel to the angle at which the ray from the center of the image plane to the center of the pupil is incident on this lens unit as shown in FIG. 9, effective diopter adjustment with little variation in aberration can be performed. It is preferable for the angle to be substantially 10° or smaller. The positions of the second lens unit G2 on the near side and on the far side in this arrangement are represented by G2a and G2b, respectively.

Tables 8, 9 and 10 show construction data, construction data at the time of diopter adjustment and aspherical coefficients when diopter adjustment is performed by linearly moving the second lens unit G2 in the second embodiment. The diopter adjustment in this case is performed by linearly moving the second lens unit G2 as is apparent from the fact that the angles in the column of the coordinates are the same. The movement direction at the time of diopter adjustment is inclined by 16.6° from the X axis. The angle at which the ray from the center of the image plane to the center of the pupil is incident on the second lens unit is 7.19°. The difference between the angles (here, 7.19° and 16.6°) is preferably small because the smaller the difference is, the more excellent the diopter adjustment performance is. When the angle difference is a, it is preferable that $0°<a<20°.$ Tables 8 and 10 correspond to Tables 5 and 7.

Figure 7:
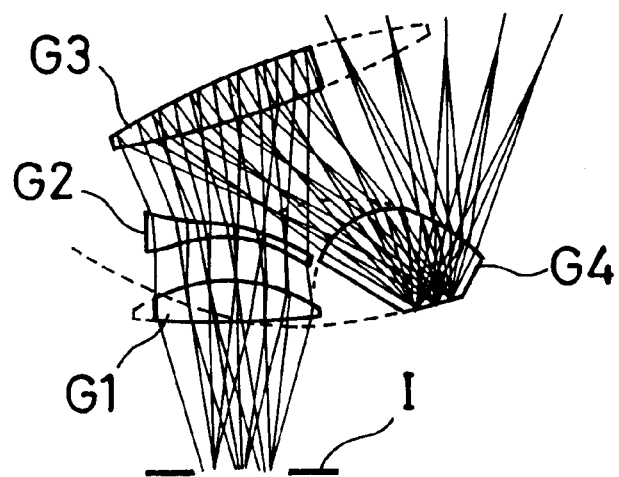
FIG. 7 is a view of the nonaxisymmetric optical system at the time of diopter adjustment (rotation, far side) (second embodiment)

The second lens unit G2 may be rotated instead of being linearly moved. FIGS. 7 and 8 illustrating the nonaxisymmetric optical system at the time of the diopter adjustment, show the second lens unit G2 of the second embodiment moved toward the far side and toward the near side, respectively. At this time, by rotating the second lens unit G2 about a center 0, i.e. an axis vertical to a plane including the ray from the center of the image plane to the center of the pupil as shown in FIG. 10, diopter adjustment with little variation in aberration can be performed like in the arrangement in which the second lens unit Gr2 is linearly moved. The positions of the second lens unit G2 on the near side and on the far side in this arrangement are represented by G2a and G2b, respectively.

When the rotation angle of the lens that is rotated at the time of diopter adjustment is b, it is preferable that $0°<b<5°.$ With this, diopter adjustment can be performed while excellent image performance is maintained.

In the case of a normal axisymmetric optical system, diopter adjustment is performed by moving the second lens unit G2 in the direction of the optical axis, whereas in the case of a nonaxisymmetric optical system, although the axis serving as the reference is not so clear, diopter adjustment can be performed by moving the second lens unit G2 in a direction substantially the same as the angle of the ray from the image plane to the center of the human pupil which ray is incident on the second lens unit G2. The diopter adjustment can be performed not only by parallelly moving the second lens unit G2 but also by rotating it about a point.

The lens element of the second lens unit G2 having a negative optical power plays an important role in correcting chromatic aberration. Generally, chromatic aberration is not a problem in a catoptric optical system but is a problem in a dioptric optical system. Chromatic aberration is also a problem in a catadioptric optical system like the one of the present invention. Here, by using a material with a small Abbe number for the second lens unit G2, chromatic aberration is effectively corrected. While the first lens unit G1 comprises an axisymmetric lens element (lens in which the optical axes of the second surface r2 and the first surface r1 coincide with each other), it may comprise a decentered lens as necessary.

FIGS. 11 to 16 shows spot diagrams of the optical systems of the embodiments:

FIG. 11a–11o show spot diagrams of the nonaxisymmetric optical system using only axisymmetric lens elements (first embodiment);

FIG. 12a–12r show spot diagrams of the nonaxisymmetric optical system (−1D) (second embodiment);

FIG. 13a14 13r show spot diagrams of the nonaxisymmetric optical system (linear movement, far side) (second embodiment);

FIG. 14a–14a show spot diagrams of the nonaxisymmetric optical system (linear movement, near side) (second embodiment);

FIG. 15a–15r show spot diagrams of the nonaxisymmetric optical system (rotation, far side) (second embodiment); and FIG. 16a–16r shows spot diagrams of the nonaxisymmetric optical system (rotation, near side) (second embodiment). The pupil diameter is 4 mm in all of these cases. These figures show spot diagrams on the image plane K when ray is incident thereon from the pupil.

Figure 17:
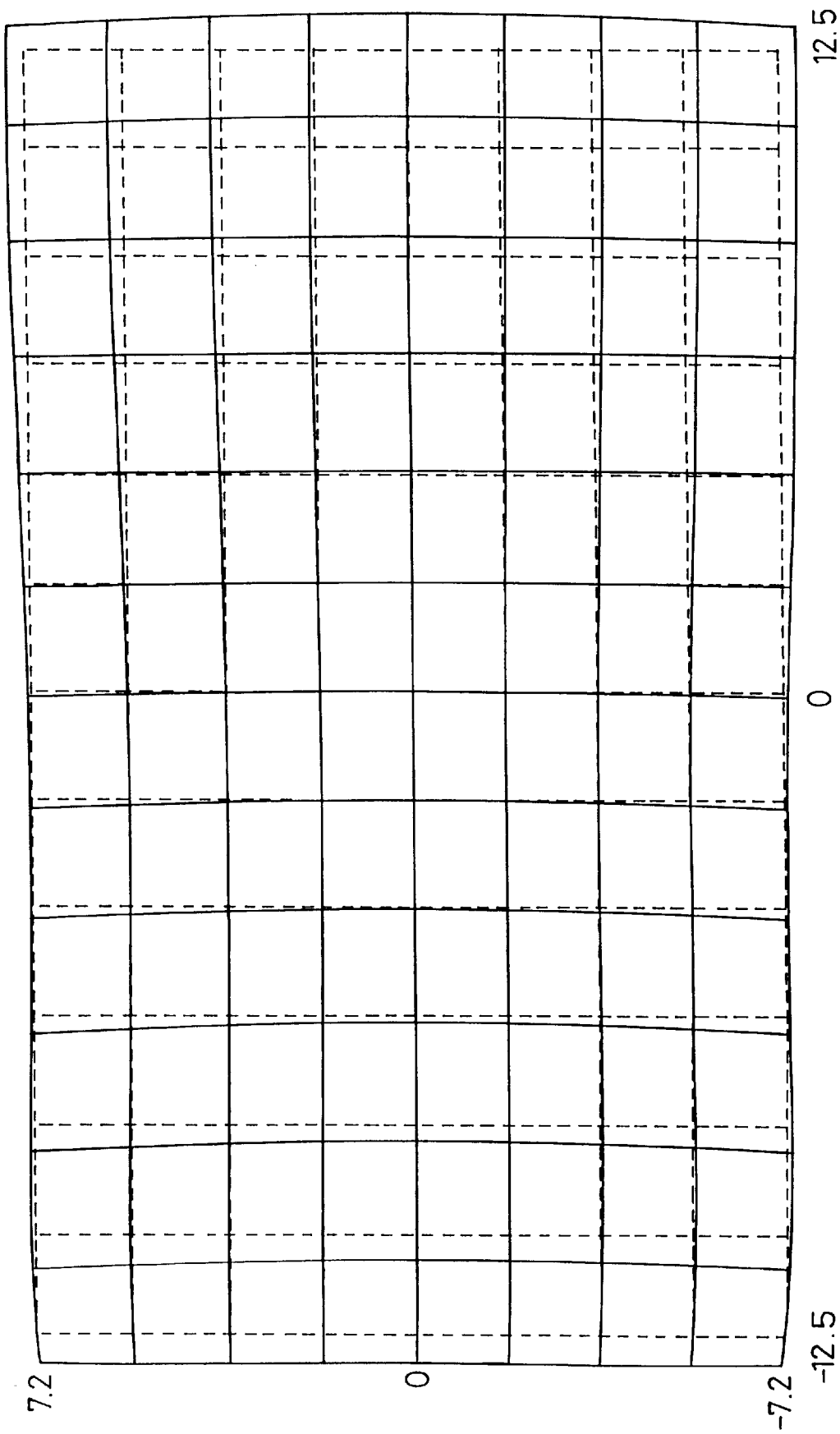
FIG. 17 is a representation of distortion of the nonaxisymmetric optical system using only axisymmetric lens elements (first embodiment)
Figure 18:
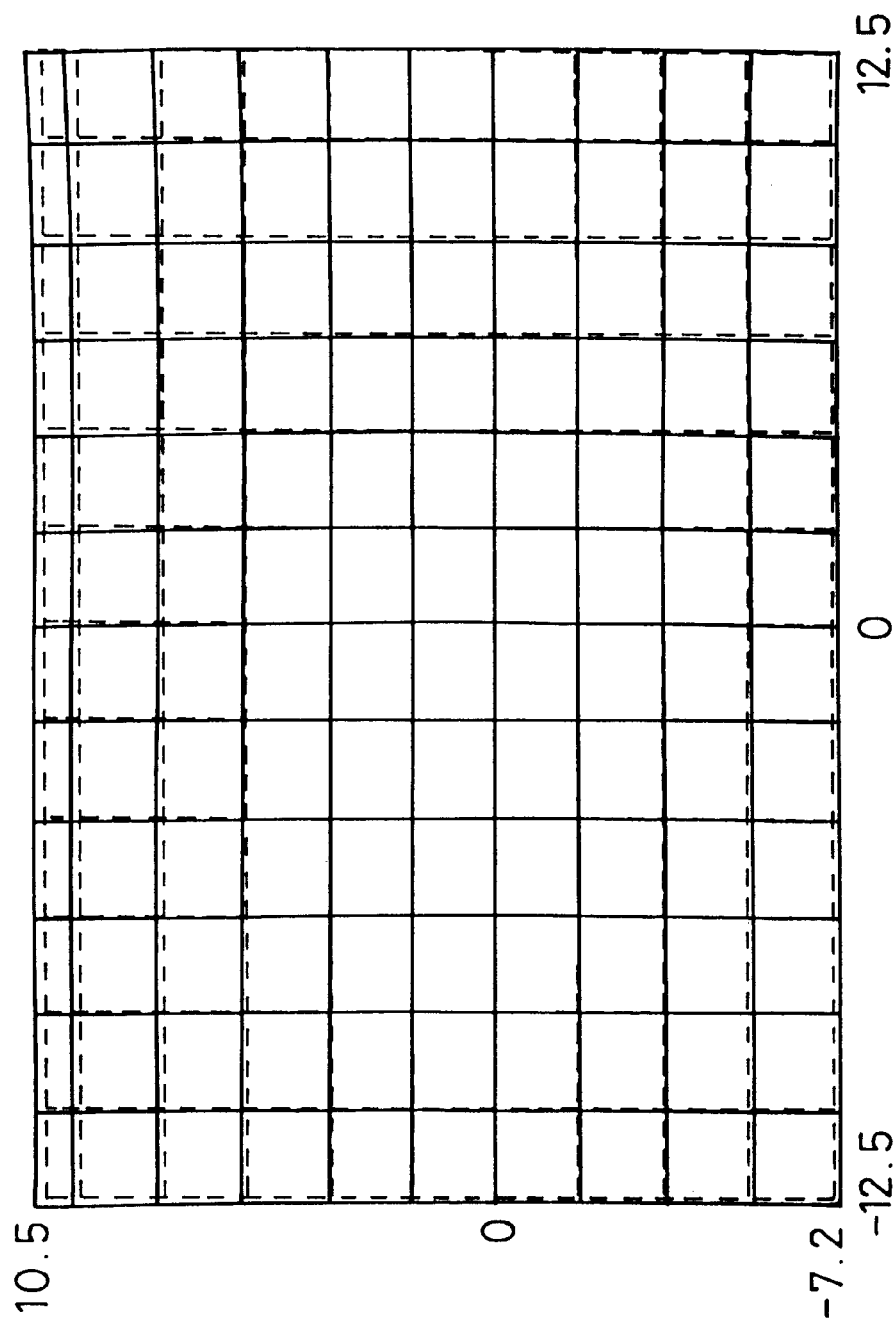
FIG. 18 is a representation of distortion of the nonaxisymmetric optical system (−1D) (second embodiment)
Figure 19:
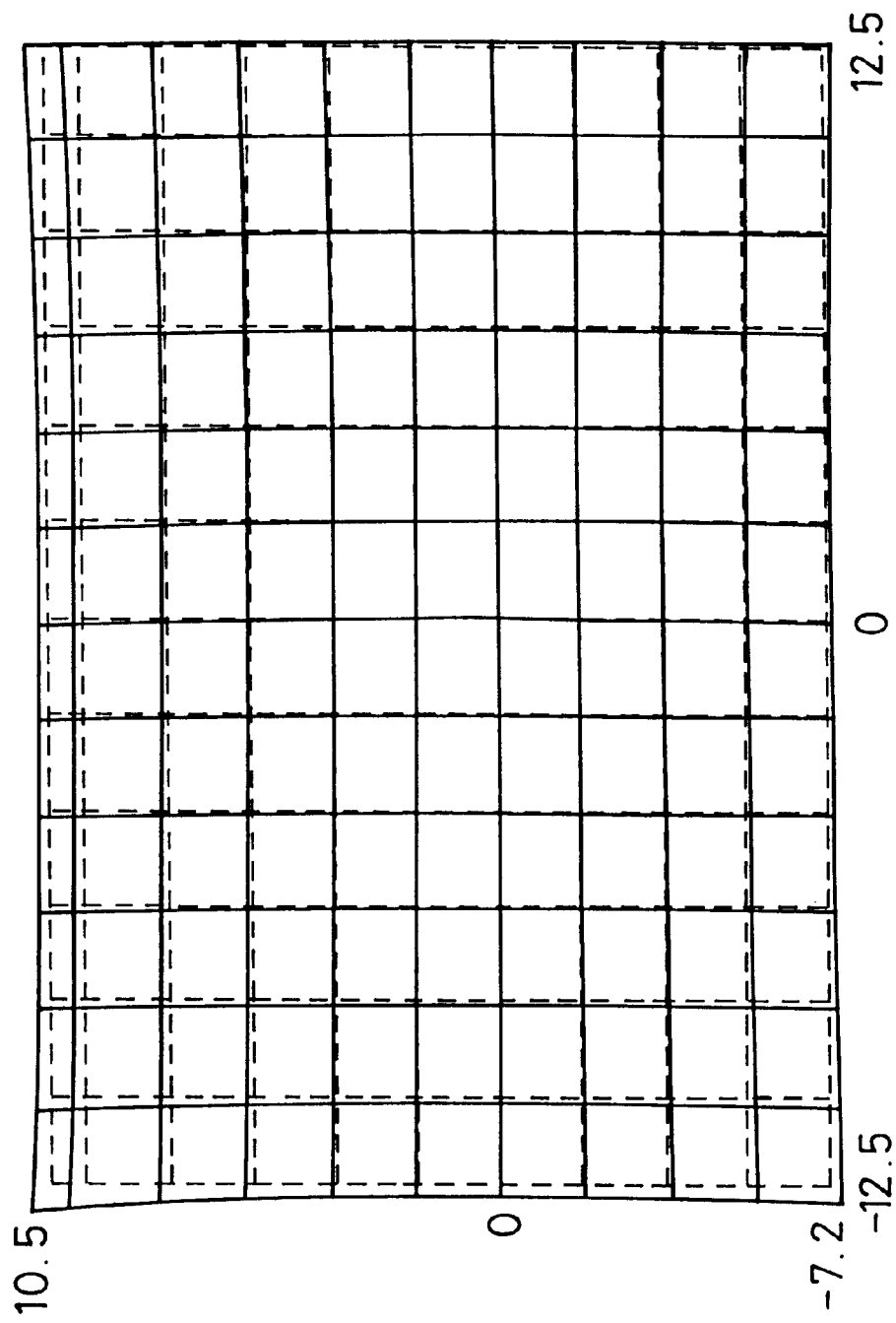
FIG. 19 is a representation of distortion of the nonaxisymmetric optical system (linear movement, far side) (second embodiment)
Figure 20:
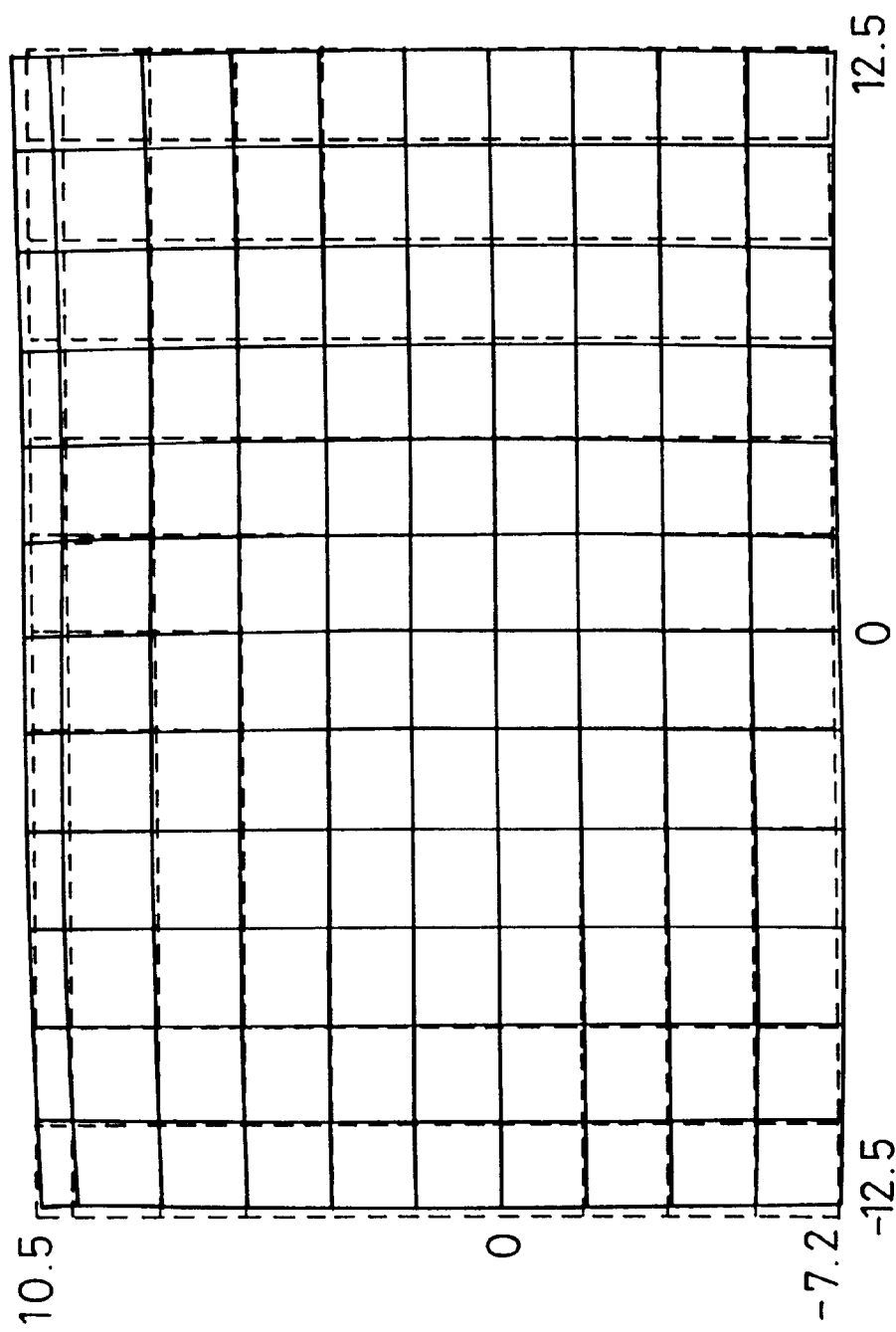
FIG. 20 is a representation of distortion of the nonaxisymmetric optical system (linear movement, near side) (second embodiment)
Figure 21:
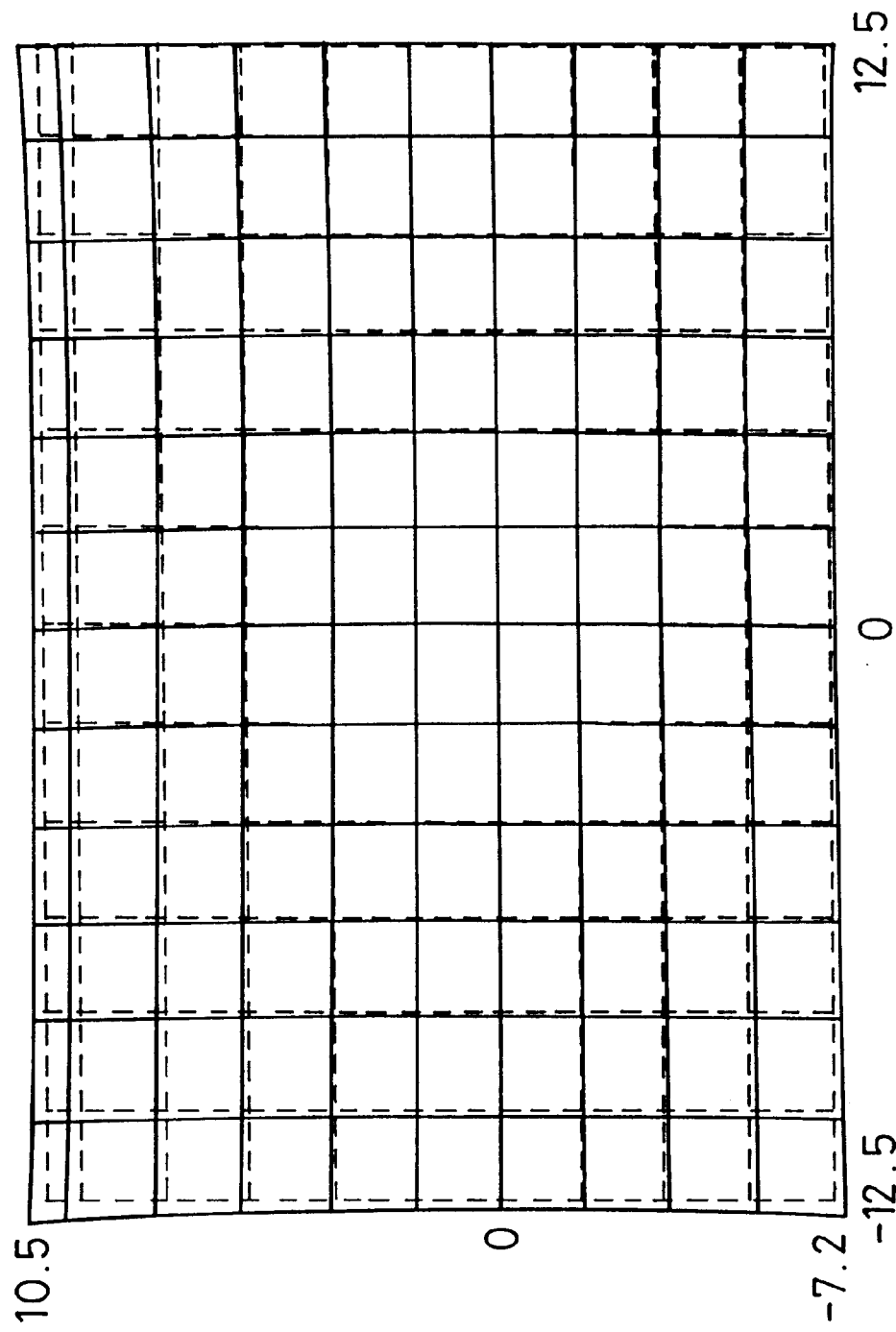
FIG. 21 is a representation of distortion of the nonaxisymmetric optical system (rotation, far side) (second embodiment)
Figure 22:
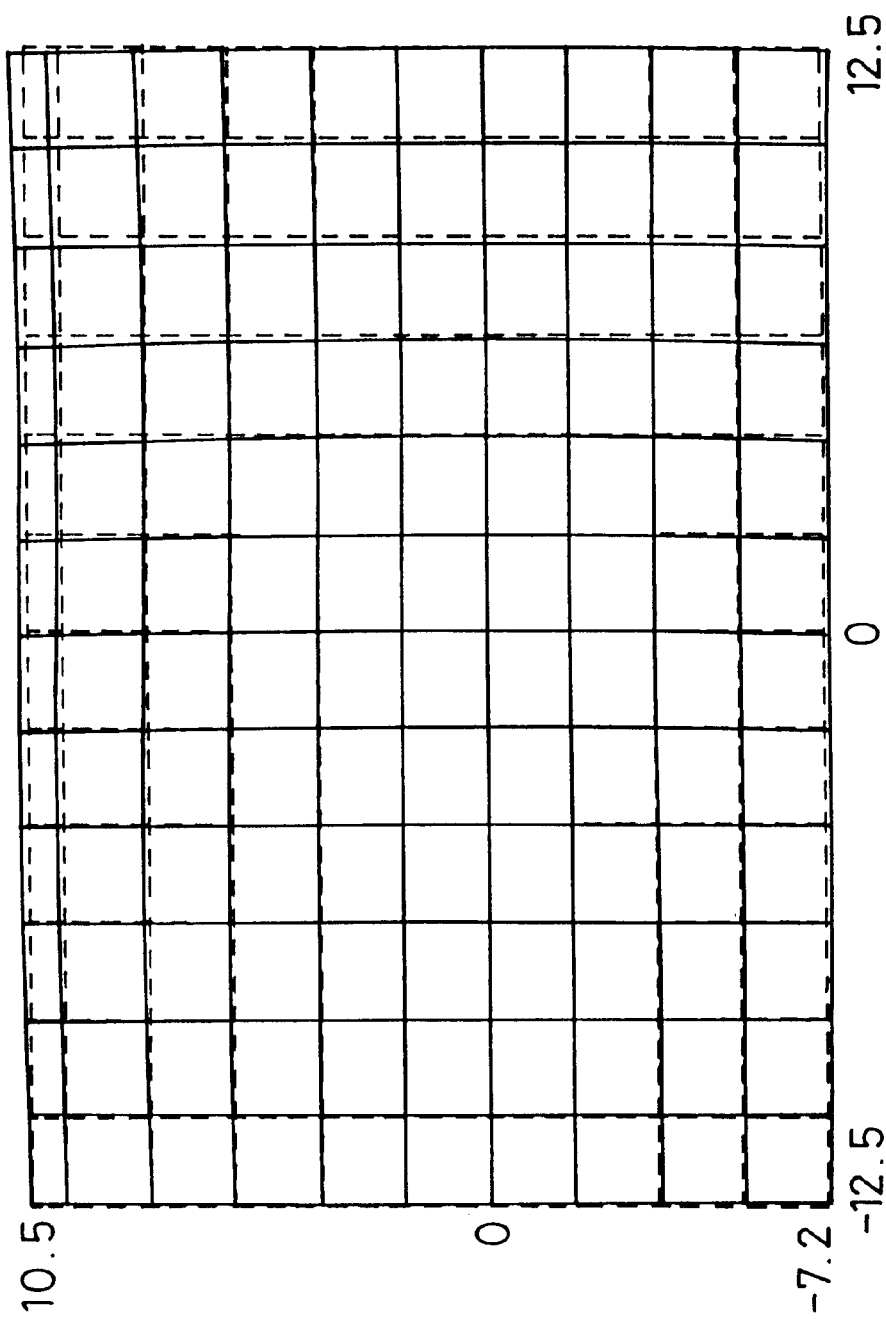
FIG. 22 is a representation of distortion of the nonaxisymmetric optical system (rotation, near side) (second embodiment)

FIGS. 17 to 22 are representations of distortion of the optical systems of the embodiments:

FIG. 17 is a representation of distortion of the nonaxisymmetric optical system using only axisymmetric lens elements (first embodiment);

FIG. 18 is a representation of distortion of the nonaxisymmetric optical system (−1D) (second embodiment);

FIG. 19 is a representation of distortion of the nonaxisymmetric optical system (linear movement, far side) (second embodiment);

FIG. 20 is a representation of distortion of the nonaxisymmetric optical system (linear movement, near side) (second embodiment);

FIG. 21 is a representation of distortion of the nonaxisymmetric optical system (rotation, far side) (second embodiment); and FIG. 22 is a representation of distortion of the nonaxisymmetric optical system (rotation, near side) (second embodiment). In these figures, distortion is evaluated by the exit angle of the ray on the pupil when the ray is incident thereon from the image plane K. These figures all show that the optical systems are sufficiently practical.

Figure 23A:
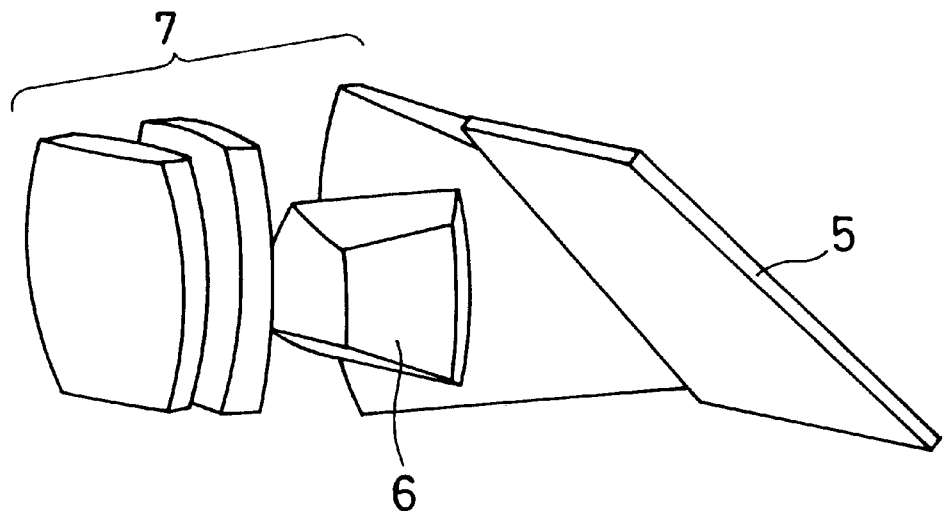
Figure 23B:
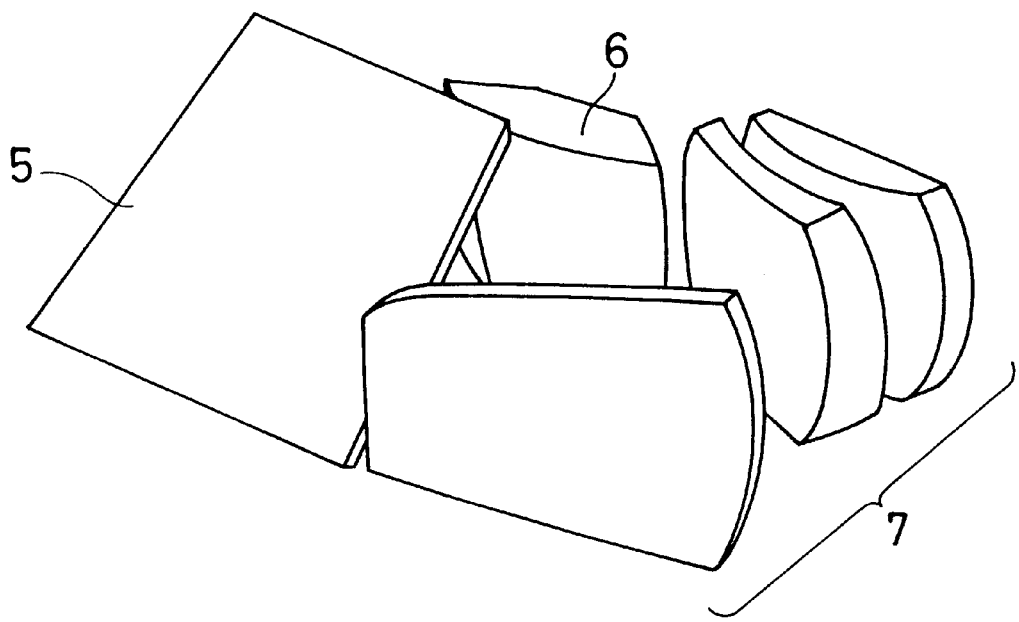
Figure 24:
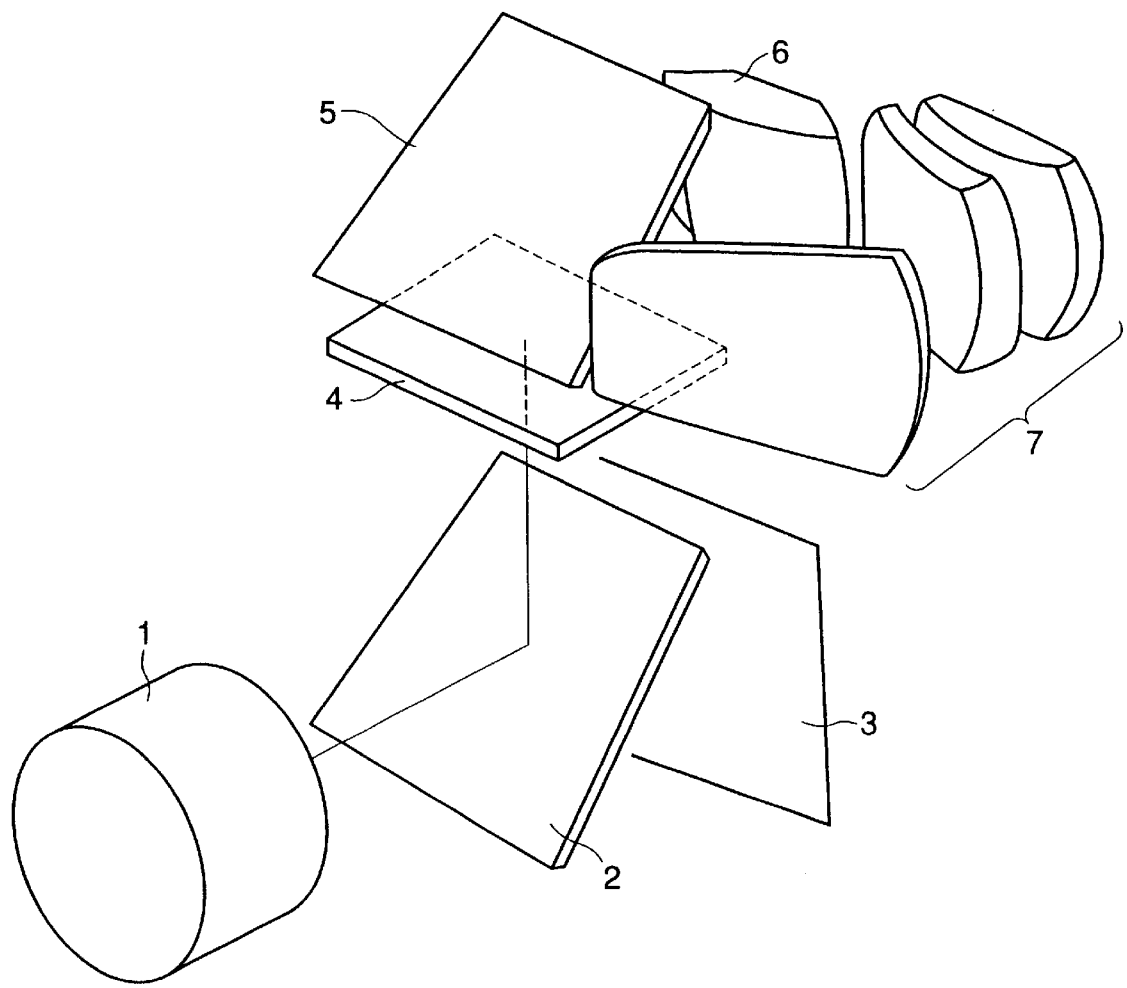

FIGS. 23A and 23B are perspective views showing only the viewfinder optical system of the nonaxisymmetric optical system of the second embodiment. FIG. 23A shows the rear side, whereas FIG. 23B shows the front side. FIG. 24 is a perspective view showing the entire optical system in a camera. In the figure, a luminous flux from a non-illustrated subject passes through a taking lens 1 to reach a half mirror 2. The luminous flux having passed through the half mirror 2 is imaged at a film plane 3 and the luminous flux reflected at the half mirror 2 is imaged at the focusing screen 4. The luminous flux from the image formed at the focusing screen 4 is reflected at a mirror 5 to be relayed to a relay lens unit 6, and passes through an eyepiece unit 7 to reach a non-illustrated pupil, thus acting as a finder.

Figure 25:
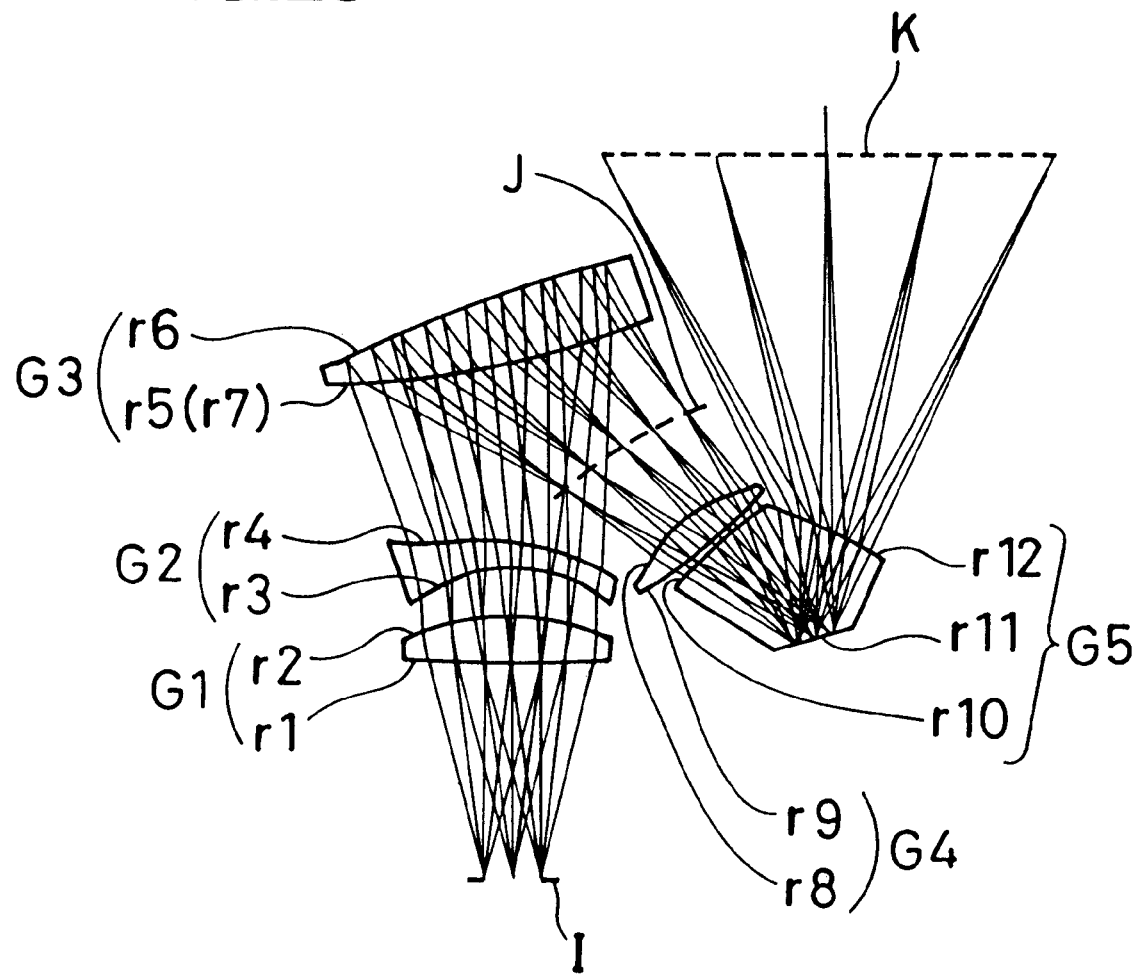

FIG. 25 shows a nonaxisymmetric optical system according to a third embodiment. In this example, the optical system comprises five lens units. As shown in the figure, light emanating from the image plane K is incident on a twelfth surface r12 of a fifth lens unit G5 of a relay lens, is reflected at an eleventh surface r11, passes through a tenth surface r10, and passes through a ninth surface r9 and an eighth surface r8 of a fourth lens unit G4 to form a real image thereof on a relay image plane J. The fourth lens unit G4 and the fifth lens unit G5 each comprise one lens element.

An eyepiece unit comprises a third lens unit G3 having a positive optical power, a second lens unit G2 having a negative optical power and a first lens unit G1 having a positive optical power. The first, the second and the third lens units G1, G2 and G3 each comprise one lens element. The light from the relay optical system is incident on a seventh surface r7 of the third lens unit G3, is reflected at a sixth surface r6, and passes through a fifth surface r5 (the same as the seventh surface r7) to be directed to the second lens unit G2. Then, the light is incident on a fourth surface r4 of the second lens unit G2, exits from a third surface r3, is incident on a second surface r2 of the first lens unit G1, and exits from a first surface r1 to reach a pupil surface I. Tables 11 and 12 show construction data and aspherical coefficients of the third embodiment, respectively.

Figure 27:
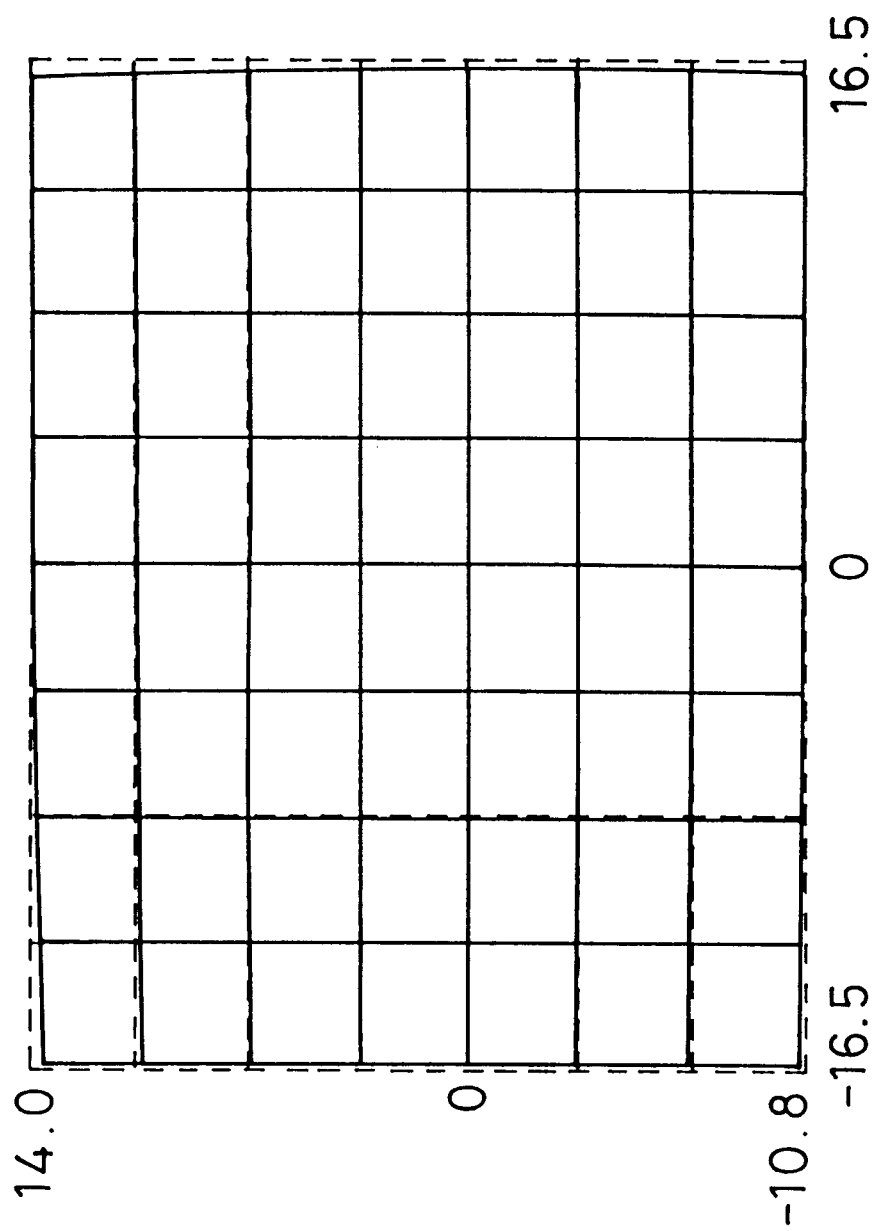

FIGS. 26*a*–26*r* and 27 show spot diagrams and representations of distortion of the nonaxisymmetric optical system of the third embodiment. These figures both show that the optical system is sufficiently practical.

When a relay optical system is formed, as is apparent from all the examples shown in the embodiments, an arrangement suitable for a viewfinder is obtained by providing the eyepiece with a greater number of lens elements than the relay optical system. This is because an optical system can be more easily arranged as a viewfinder and space efficiency is excellent when the space occupied by the eyepiece optical system is larger than that occupied by the relay optical system and because aberration correction by the eyepiece optical system is more efficient than aberration correction by the relay optical system.

Obviously, many modifications and variations of the present invention are possible in light of the above teachings. It is therefore to be understood that within the scope of the appended claims, the invention may be practiced other than as specifically described.

TABLE 1

| Construction | Central diopter [Diopt.] | Finder magnification | Anamorphic ratio (Y/Z) | Remarks |
|---|---|---|---|---|
| 1st embodiment | −1.00 | 0.80 | −0.03 | Objective lens F1 = 40 mm |
| 2nd embodiment | −1.00 | 0.80 | −0.02 | Objective lens F1 = 40 mm |
| 3rd embodiment | −1.00 | 0.75 | 0.00 | Objective lens F1 = 50 mm |

TABLE 2

| Diopter adjustment construction | Central diopter [Diopt.] | Finder magnification | Anamorphic ratio (Y/Z) | Remarks |
|---|---|---|---|---|
| 2nd embodiment | −1.00 | 0.80 | −0.02 | Objective lens F1 = 40 mm |
| 2nd embodiment Rotation, Near side | −3.25 | 0.79 | — | Objective lens F1 = 40 mm |
| 2nd embodiment Rotation, Far side | 1.25 | 0.81 | — | Objective lens F1 = 40 mm |
| 2nd embodiment Linear movement, Near Side | −3.34 | 0.79 | — | Objective lens F1 = 40 mm |
| 2nd embodiment Linear movement, Far Side | 1.25 | 0.81 | — | Objective lens F1 = 40 mm |

TABLE 3

| Name | | Coordinates | | Angle | Distance | Radius of curvature | Refractive index N e | Abbe number ν d |
|---|---|---|---|---|---|---|---|---|
| Unit | Surface | X | Z | [deg.] | | | | |
| Pupil | I | 0.000 | 0.000 | 0.000 | | — | | |
| G1 | r1 | 15.434 | −4.848 | 5.104 | | −4677.22 | 1 | — |
| | | | | | 6.048 | | 1.52729 | 56.38 |
| | r2 | | | | | −15.417 | | |
| | | | | | | | 1 | — |
| G2 | r3 | 21.699 | −5.120 | 2.328 | | −15.018 | | |
| | | | | | 0.485 | | 1.62627 | 24.01 |
| | r4 | | | | | −22.275 | | |
| | | | | | | | 1 | — |
| G3 | r5 | 40.528 | −3.792 | 15.581 | | −171.546 | | |
| | | | | | 4.504 | | 1.52729 | 56.38 |
| | r6 | | | | | −58.021 | | |
| | r7 | (The same as r5) | | | | | | |

TABLE 3-continued

| Unit | Name Surface | Coordinates X | Z | Angle [deg.] | Distance | Radius of curvature | Refractive index N e | Abbe number ν d |
|---|---|---|---|---|---|---|---|---|
| G4 | r8 | 29.184 | −15.932 | −170.214 | | 10.397 | 1 | — |
| | r9 | | | | 9.711 | −55.109 | 1.52729 | 56.38 |
| | r10 | (The same as r8) | | | | | 1 | — |
| Evaluation surface | K | 54.384 | −24.952 | 0.000 | | — | | |

TABLE 4

| Surface | Aspherical coefficient ε | A4 | A6 |
|---|---|---|---|
| r1 | 1 | −4.27E−06 | 2.90E−07 |
| r2 | 1 | −3.45E−05 | 5.66E−07 |
| r3 | 1 | 2.89E−05 | 4.26E−07 |
| r4 | 1 | 5.28E−05 | 2.83E−07 |
| r5 (r7) | 1 | 5.13E−05 | −2.84E−07 |
| r6 | 1 | 1.53E−05 | −8.12E−08 |
| r8 (r10) | 1 | −1.22E−04 | −1.99E−06 |
| r9 | 1 | 6.42E−05 | 1.22E−06 |

TABLE 5

| Unit | Name Surface | Coordinates X | Z | Angle [deg.] | Distance | Radius of curvature | Refractive index N e | Abbe number ν d |
|---|---|---|---|---|---|---|---|---|
| Pupil | I | 0.000 | 0.000 | 0.000 | | — | | |
| G1 | r1 | 16.000 | 1.300 | 0.000 | | 95.261 | 1 | — |
| | r2 | | | | 4.7 | −14.773 | 1.49329 | 57.82 |
| G2 | r3 | 23.600 | −0.500 | −8.648 | | −11.714 | 1 | — |
| | r4 | 24.400 | −1.700 | −16.599 | | −21.146 | 1.62627 | 24.01 |
| G3 | r5 | 39.250 | −3.800 | 19.453 | | 92.421 | 1 | — |
| | r6 | | | | 4.85 | −73.368 | 1.52729 | 56.38 |
| | r7 | (The same as r5) | | | | | | |
| G4 | r8 | 26.100 | −11.100 | −138.960 | | 7.587 | 1 | — |
| | r9 | 15.700 | −2.200 | 172.385 | | −26.178 | 1.52729 | 56.38 |
| | Aperature diaphragm | 17.750 | −20.471 | 14.678 | | — | 1.52729 | 56.38 |
| | r10 | 28.950 | −15.100 | −10.857 | | −16.532 | 1.52729 | 56.38 |
| Evaluation surface | K | 48.900 | −21.990 | 0.000 | | — | 1 | — |

TABLE 6

Diopter adjustment construction

| Name | | Coordinates | | Angle |
|---|---|---|---|---|
| Unit | Surface | X | Z | [deg.] |
| G2 | r3N | 21.902 | −0.980 | −9.303 |
| (Diopter near side) | r4N | 22.688 | −2.189 | −17.254 |
| G2 | r3F | 25.331 | 0.011 | −7.978 |
| (Diopter far side) | r4F | 26.145 | −1.180 | −15.929 |

TABLE 7

Aspherical coefficient

| Surface | $\epsilon$ | A4 | A6 | A8 | A10 | A12 |
|---|---|---|---|---|---|---|
| r2 | 1 | 7.97E−05 | −2.02E−06 | 4.35E−08 | −4.08E−10 | 1.50E−12 |
| r3 | 1 | 1.54E−04 | 1.46E−06 | −1.33E−08 | 9.10E−11 | 6.08E−14 |
| r4 | 1 | 1.31E−04 | −1.71E−07 | 6.00E−09 | −4.96E−11 | 1.31E−13 |
| r5 (r7) | 1 | 1.29E−05 | −1.20E−07 | 2.18E−10 | 5.77E−13 | −1.47E−15 |
| r6 | 1 | 8.54E−06 | −3.81E−08 | 2.69E−11 | 1.99E−13 | −3.00E−16 |
| r8 | 1 | −1.12E−04 | −3.16E−05 | 1.52E−06 | −3.87E−08 | 3.30E−10 |
| r9 | 1 | 3.39E−05 | −3.67E−08 | 3.01E−11 | −2.20E−14 | 7.11E−17 |
| r10 | 1 | 1.23E−04 | −9.21E−07 | 1.00E−09 | 6.14E−11 | −3.13E−13 |

TABLE 8

| Name | | Coordinates | | Angle | | Radius of | Refractive | Abbe number |
|---|---|---|---|---|---|---|---|---|
| Unit | Surface | X | Z | [deg.] | Distance | curvature | index N e | ν d |
| Pupil | I | 0.000 | 0.000 | 0.000 | | — | | |
| | | | | | | | 1 | — |
| G1 | r1 | 16.000 | 1.300 | 0.000 | | 95.261 | | |
| | | | | | 4.7 | | 1.49329 | 57.82 |
| | r2 | | | | | −14.773 | | |
| | | | | | | | 1 | — |
| G2 | r3 | 23.600 | −0.500 | −8.648 | | −11.714 | | |
| | | | | | | | 1.62627 | 24.01 |
| | r4 | 24.400 | −1.700 | −16.599 | | −21.146 | | |
| | | | | | | | 1 | — |
| G3 | r5 | 39.250 | −3.800 | 19.453 | | 92.421 | | |
| | | | | | 4.85 | | 1.52729 | 56.38 |
| | r6 | | | | | −73.368 | | |
| | r7 | (The same as r5) | | | | | | |
| | | | | | | | 1 | — |
| G4 | r8 | 26.100 | −11.100 | −138.960 | | 7.587 | | |
| | | | | | | | 1.52729 | 56.38 |
| | r9 | 15.700 | −2.200 | 172.385 | | −26.178 | | |
| | | | | | | | 1.52729 | 56.38 |
| | Aperture diaphragm | 17.750 | −20.471 | 14.678 | | — | | |
| | | | | | | | 1.52729 | 56.38 |
| | r10 | 28.950 | −15.100 | −10.857 | | −16.532 | | |
| | | | | | | | 1 | — |
| Evaluation surface | K | 48.900 | −21.990 | 0.000 | | — | | |

TABLE 9

Diopter adjustment construction

| Name | | Coordinates | | |
|------|---------|--------|--------|--------|
| | | | | Angle |
| Unit | Surface | X | Z | [deg.] |
| G2 | r3 | 21.850 | −1.000 | −8.648 |
| (Diopter near side) | r4 | 22.650 | −2.200 | −16.599 |
| G2 | r3 | 25.350 | 0.000 | −8.648 |
| (Diopter far side) | r4 | 26.150 | −1.200 | −16.599 |

TABLE 10

Aspherical coefficient

| Surface | $\epsilon$ | A4 | A6 | A8 | A10 | A12 |
|---------|---|----------|-----------|----------|-----------|-----------|
| r2 | 1 | 7.97E−05 | −2.02E−06 | 4.35E−08 | −4.08E−10 | 1.50E−12 |
| r3 | 1 | 1.54E−04 | 1.46E−06 | −1.33E−08 | 9.10E−11 | 6.08E−14 |
| r4 | 1 | 1.31E−04 | −1.71E−07 | 6.00E−09 | −4.96E−11 | 1.31E−13 |
| r5 (r7) | 1 | 1.29E−05 | −1.20E−07 | 2.18E−10 | 5.77E−13 | −1.47E−15 |
| r6 | 1 | 8.54E−06 | −3.81E−08 | 2.69E−11 | 1.99E−13 | −3.00E−16 |
| r8 | 1 | −1.12E−04 | −3.16E−05 | 1.52E−06 | −3.87E−08 | 3.30E−10 |
| r9 | 1 | 3.39E−05 | −3.67E−08 | 3.01E−11 | −2.20E−14 | 7.11E−17 |
| r10 | 1 | 1.23E−04 | −9.21E−07 | 1.00E−09 | 6.14E−11 | −3.13E−13 |

TABLE 11

| Name | | Coordinates | | | | Radius of | Refractive | Abbe number |
|------|---------|--------|---------|--------|----------|-----------|------------|-------------|
| | | | | Angle | | | | |
| Unit | Surface | X | Z | [deg.] | Distance | curvature | index N e | ν d |
| Pupil | I | 0.000 | 0.000 | 0.000 | | — | | |
| | | | | | | | 1 | — |
| G1 | r1 | 16.176 | 0.160 | 0.000 | | 110.229 | | |
| | | | | | 3.52 | | 1.49329 | 57.82 |
| | r2 | | | | | −15.624 | | |
| | | | | | | | 1 | — |
| G2 | r3 | 23.079 | −1.572 | −7.342 | | −10.138 | | |
| | | | | | | | 1.62627 | 24.01 |
| | r4 | 23.606 | −5.607 | −26.057 | | −15.122 | | |
| | | | | | | | 1 | — |
| G3 | r5 | 40.015 | −5.411 | −162.186 | | −53.459 | | |
| | | | | | 5.41 | | 1.52729 | 56.38 |
| | r6 | | | | | 102.909 | | |
| | r7 | (The same as r5) | | | | | | |
| | | | | | | | 1 | — |
| G4 | r8 | 26.984 | −12.631 | −139.698 | | 8.534 | | |
| | | | | | 2.51 | | 1.52729 | 56.38 |
| | r9 | | | | | −102.329 | | |
| G5 | r10 | 26.706 | −16.962 | −141.345 | | 40.273 | | |
| | | | | | | | 1.52729 | 56.38 |
| | r11 | 15.365 | −4.025 | −5.752 | | −24.193 | | |
| | | | | | | | 1.52729 | 56.38 |
| | Aperture diaphragm | 18.053 | −22.222 | 16.375 | | — | | |
| | | | | | | | 1.52729 | 56.38 |
| | r10 | 29.021 | −15.874 | −14.131 | | −31.870 | | |
| | | | | | | | 1 | — |

TABLE 11-continued

| Name | | Coordinates | | Angle | | Radius of | Refractive | Abbe number |
|------|---------|--------|---------|--------|----------|-----------|------------|-------------|
| Unit | Surface | X | Z | [deg.] | Distance | curvature | index N e | ν d |
| Evaluation surface | K | 54.153 | −23.580 | 0.000 | | — | | |

TABLE 12

| Surface | ε | Aspherical coefficient | | | | |
|---------|---|-------|-------|-------|-------|-------|
| | | A4 | A6 | A8 | A10 | A12 |
| r2 | 1 | 6.83E−05 | −2.25E−06 | 5.59E−08 | −6.03E−10 | 2.64E−12 |
| r3 | 1 | 7.08E−05 | 1.77E−06 | −7.47E−09 | −8.81E−11 | 2.65E−12 |
| r4 | 1 | 5.57E−05 | −2.24E−07 | 4.60E−09 | −1.99E−11 | 4.87E−14 |
| r5 (r7) | 1 | 9.42E−06 | −1.47E−07 | 1.52E−10 | 1.00E−12 | −1.53E−15 |
| r6 | 1 | 8.301E−06 | −4.87E−08 | 4.97E−11 | 1.21E−13 | −1.13E−18 |
| r8 | 1 | −1.07E−05 | −5.51E−05 | 2.62E−06 | −6.56E−08 | 5.69E−10 |
| r9 | 1 | −8.26E−05 | −1.77E−06 | 9.77E−09 | −1.46E−09 | −5.36E−12 |
| r10 | 1 | −3.34E−06 | −9.26E−07 | 1.48E−08 | 4.04E−10 | −5.29E−12 |
| r11 | 1 | 4.44E−05 | −4.68E−08 | 2.94E−11 | −2.04E−14 | 1.22E−16 |
| r12 | 1 | 7.55E−05 | −9.41E−07 | 1.40E−09 | 5.77E−11 | −2.76E−13 |

What is claimed is:

1. A viewfinder optical system for directing a luminous flux emanating from an image plane to a pupil, comprising:
an eyepiece optical system having, in order from a side of the pupil, a first lens unit including at least one surface having a positive optical power, a second lens unit including at least one surface having a negative optical power and a third lens unit including a reflecting surface having a positive optical power.

2. A viewfinder optical system as claimed in claim 1, wherein said reflecting surface is a concave back-surface-reflecting surface of a lens element.

3. A viewfinder optical system as claimed in claim 1, wherein when an Abbe number of the second lens unit is νd, 20<νd<40 is fulfilled.

4. A viewfinder optical system as claimed in claim 1, wherein diopter adjustment is performed by moving the second lens unit.

5. A viewfinder optical system as claimed in claim 4, wherein said second lens unit is linearly moved in a direction substantially parallel to an angle at which a ray from a center of the image plane to a center of the pupil is incident on the second lens unit.

6. A viewfinder optical system as claimed in claim 4, wherein said second lens unit is rotated about an axis vertical to a plane including a ray from a center of the image plane to a center of the pupil.

7. A viewfinder optical system as claimed in claim 5, wherein when a difference between the angle at which the ray from the center of the image plane to the center of the pupil is incident on the second lens unit, and an angle of the direction in which the second lens unit is moved for the diopter adjustment is a, 0°<a<20° is fulfilled.

8. A viewfinder optical system as claimed in claim 6, wherein when a rotation angle of the second lens unit rotated for the diopter adjustment is b, 0°<b<5° is fulfilled.

9. A viewfinder optical system as claimed in claim 2, wherein when a radius of curvature of the reflecting surface is CR, |CR|<200 is fulfilled.

10. A viewfinder optical system as claimed in claim 1, wherein a most pupil side surface of the second lens unit is convex to a side of the image plane.

11. A viewfinder optical system for directing a luminous flux emanating from an image plane to a pupil, comprising:
a relay optical system for relaying the luminous influx, the relay optical system being provided with a single lens element having an incident surface on which the luminous flux is incident, a reflecting surface reflecting the incident luminous flux, and an exit surface from which the reflected luminous flux exits,
wherein the incident, reflecting and exit surfaces have different curvatures.

12. A viewfinder optical system as claimed in claim 11, wherein a number of said reflecting surface is one.

13. A viewfinder optical system as claimed in claim 11, wherein said reflecting surface has a positive optical power.

14. A viewfinder optical system as claimed in claim 11, wherein at least one of said incident surface and said exit surface has a positive optical power.

15. A viewfinder optical system as claimed in claim 11, wherein when an Abbe number of said single lens element is νd, 30<νd<70 is fulfilled.

16. A viewfinder optical system as claimed in claim 13, wherein when a radius of curvature of said reflecting surface is CR, |CR|<100 is fulfilled.

17. A viewfinder optical system for directing a luminous flux emanating from an image plane to a pupil, comprising:
a relay optical system for reforming an image on the image plane by focusing the luminous flux as an intermediate image, the relay optical system consisting solely of a single lens element having a reflecting surface reflecting the luminous flux.

18. A viewfinder optical system as claimed in claim 17, wherein a number of said reflecting surface is one.

19. A viewfinder optical system as claimed in claim 17, wherein said reflecting surface has a positive optical power.

20. A viewfinder optical system as claimed in claim 17, wherein said single lens element has an incident surface on which the luminous flux is incident and an exit surface from which the luminous flux reflected at the reflecting surface exits, and wherein said incident and exit surfaces have different curvatures.

21. A viewfinder optical system as claimed in claim 20, wherein a number of said reflecting surface is one.

22. A viewfinder optical system as claimed in claim 20, wherein said reflecting surface has a positive optical power.

23. A viewfinder optical system as claimed in claim 20, wherein at least one of said incident surface and said exit surface has a positive optical power.

24. A viewfinder optical system as claimed in claim 17, wherein when an Abbe number of said single lens element is vd, 30<vd<70 is fulfilled.

25. A viewfinder optical system as claimed in claim 19, wherein when a radius of curvature of said reflecting surface is CR, |CR|<100 is fulfilled.

26. A viewfinder optical system for directing a luminous flux emanating from an image plane to a pupil, comprising:

a relay optical system for reforming an image on the image plane by focusing the luminous flux as an intermediate image, the relay optical system having a reflecting surface reflecting the luminous flux; and an eyepiece optical system for enlarging the image reformed by the relay optical system, the eyepiece optical system having a reflecting surface reflecting the luminous flux, and the eyepiece optical system having a greater number of optical elements than the relay optical system.

27. A viewfinder optical system for directing a luminous flux emanating from an image plane to a pupil, comprising:

a relay optical system for relaying the luminous flux, the relay optical system consisting of a single lens element having a reflecting surface reflecting the luminous flux; and an eyepiece optical system for enlarging the image luminous lux relayed by the relay optical system, the eyepiece optical system having a first lens unit including at least one surface having a positive optical power, a second lens unit including at least one surface having a negative optical power and a third lens unit including a reflecting surface having a positive optical power.

28. A viewfinder optical system for directing a luminous flux emanating from an image plane to a pupil, comprising:

a relay optical system for relaying the luminous flux, the relay optical system consisting of a single lens element;

the single lens element having an incident surface on which the luminous flux is incident, a reflecting surface reflecting the incident luminous flux and an exit surface from which the luminous flux reflected at the reflecting surface exits; and an eyepiece optical system for enlarging the luminous flux relayed by the relay optical system, the eyepiece optical system having a first lens unit including at least one surface having a positive optical power, a second lens unit including at least one surface having a negative optical power and a third lens unit including a reflecting surface having a positive optical power, wherein the incident, reflecting and exit surfaces have different curvatures.

29. A viewfinder optical system for directing a luminous flux emanating from an image plane to a pupil, comprising:

a relay optical system for relaying the luminous flux, the relay optical system consisting of a single lens element;

the single lens element having an incident surface on which the luminous flux is incident, a reflecting surface reflecting the incident luminous flux and an exit surface from which the luminous flux reflected at the reflecting surface exits; and an eyepiece optical system for enlarging the luminous flux relayed by the relay optical system, the eyepiece optical system having, from a side of the pupil, a first lens unit including at least one surface having a positive optical power, a second lens unit including at least one surface having a negative optical power and a third lens unit including a reflecting surface having a positive optical power, wherein the incident, reflecting and exit surfaces have different curvatures.

30. A viewfinder optical system as claimed in claim 26, wherein said eyepiece optical system comprises three lens elements.

31. A viewfinder optical system as claimed in claim 27, wherein said eyepiece optical system comprises three lens elements.

32. A viewfinder optical system as claimed in claim 28, wherein said eyepiece optical system comprises three lens elements.

33. A viewfinder optical system as claimed in claim 29, wherein said eyepiece optical system comprises three lens elements.

34. A viewfinder optical system as claimed in claim 17, wherein said reflecting surface is in a position substantially conjugate with the pupil.

35. A viewfinder optical system as claimed in claim 17, wherein a shape of said reflecting surface is circular.

36. A viewfinder optical system as claimed in claim 17, wherein a shape of said reflecting surface is rectangular.

37. A viewfinder optical system as claimed in claim 17, wherein a shape of said reflecting surface is elliptical.

38. A viewfinder optical system as claimed in claim 17 further comprising a diaphragm, wherein said diaphragm surrounds said reflecting surface.

39. A viewfinder optical system as claimed in claim 38, wherein when a reflectance of said reflecting surface is Ri and a reflectance of said diaphragm is Ro, Ri/Ro>10 is fulfilled.

40. An optical element provided in a viewfinder optical system comprising:

an incident surface on which a luminous flux is incident;

a reflecting surface for reflecting the incident luminous flux; and an exit surface from which the reflected luminous flux exits, wherein the incident, reflecting, and exit surfaces have different, finite curvatures.

41. An optical element as claimed in claim 40, wherein a number of the reflecting surface is one.

42. An optical element as claimed in claim 40, wherein the reflecting surface has a positive optical power.

43. An optical element as claimed in claim 40, wherein at least one of the incident and exit surfaces has a positive optical power.

* * * * *

UNITED STATES PATENT AND TRADEMARK OFFICE
CERTIFICATE OF CORRECTION

PATENT NO : 6,122,454
DATED : September 19, 2000
INVENTOR(S): Jun ISHIHARA

It is certified that error appears in the above-identified patent and that said Letters Patent is hereby corrected as shown below:

Column 18, line 39 (claim 11, line 3), delete "influx", and insert --flux--.

Column 19, line 45 (claim 27, line 7), delete "image".

Column 19, line 46 (claim 27, line 8), delete "lux", and insert --flux--.

Signed and Sealed this

Twenty-second Day of May, 2001

Attest:

NICHOLAS P. GODICI

Attesting Officer

Acting Director of the United States Patent and Trademark Office